(12) United States Patent
Hagiwara

(10) Patent No.: US 8,891,173 B2
(45) Date of Patent: Nov. 18, 2014

(54) ZOOM LENS AND IMAGE PICKUP APPARATUS WITH THE ZOOM LENS

(75) Inventor: Yasuaki Hagiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 13/280,685

(22) Filed: Oct. 25, 2011

(65) Prior Publication Data

US 2012/0105708 A1   May 3, 2012

(30) Foreign Application Priority Data

Nov. 1, 2010  (JP) ................................. 2010-245077
Sep. 29, 2011  (JP) ................................. 2011-214967

(51) Int. Cl.
*G02B 15/14*   (2006.01)
*G02B 15/173*   (2006.01)
*G02B 15/24*   (2006.01)
*H04N 5/225*   (2006.01)
*G02B 27/64*   (2006.01)

(52) U.S. Cl.
CPC .............. *G02B 15/173* (2013.01); *G02B 15/24* (2013.01); *G02B 15/14* (2013.01); *G02B 27/646* (2013.01); *H04N 5/2254* (2013.01)
USPC ............................ 359/685; 359/676; 359/766

(58) Field of Classification Search
CPC ...... G02B 15/14; G02B 15/16; G02B 15/163; G02B 15/24
USPC ......... 359/554, 557, 676, 682, 685, 714, 763, 359/764, 766
See application file for complete search history.

(56) References Cited

U.S. PATENT DOCUMENTS

| | | | | |
|---|---|---|---|---|
| 5,388,004 | A * | 2/1995 | Adachi | 359/683 |
| 7,139,131 | B2 * | 11/2006 | Nanba et al. | 359/687 |
| 7,187,504 | B2 * | 3/2007 | Horiuchi | 359/683 |
| 7,609,446 | B2 * | 10/2009 | Nanba | 359/557 |
| 7,616,386 | B2 * | 11/2009 | Kimura | 359/690 |
| 2006/0279850 | A1 * | 12/2006 | Horiuchi | 359/676 |
| 2007/0201146 | A1 * | 8/2007 | Saruwatari | 359/690 |
| 2011/0080652 | A1 * | 4/2011 | Nakayama et al. | 359/683 |

FOREIGN PATENT DOCUMENTS

| | | |
|---|---|---|
| CN | 1877387 A | 12/2006 |
| CN | 101852911 A | 10/2010 |
| JP | 2988164 B2 | 12/1999 |
| JP | 2007264395 A | 10/2007 |
| WO | 2007032505 A1 | 3/2007 |

* cited by examiner

*Primary Examiner* — Thong Nguyen
(74) *Attorney, Agent, or Firm* — Canon USA Inc. IP Division

(57) ABSTRACT

A zoom lens includes, in order from an object side to an image side, a first lens unit having a positive refractive power, a second lens unit having a negative refractive power, an aperture stop, a third lens unit having a positive refractive power, a fourth lens unit having a negative refractive power, and a fifth lens unit having a positive refractive power. In the zoom lens, during zooming from a wide-angle end to a telephoto end, the first lens unit is configured to remain stationary, the second lens unit, the third lens unit, and the fourth lens unit are configured to move separately from one another, and the aperture stop is configured to move along a locus convex towards the object side.

17 Claims, 35 Drawing Sheets

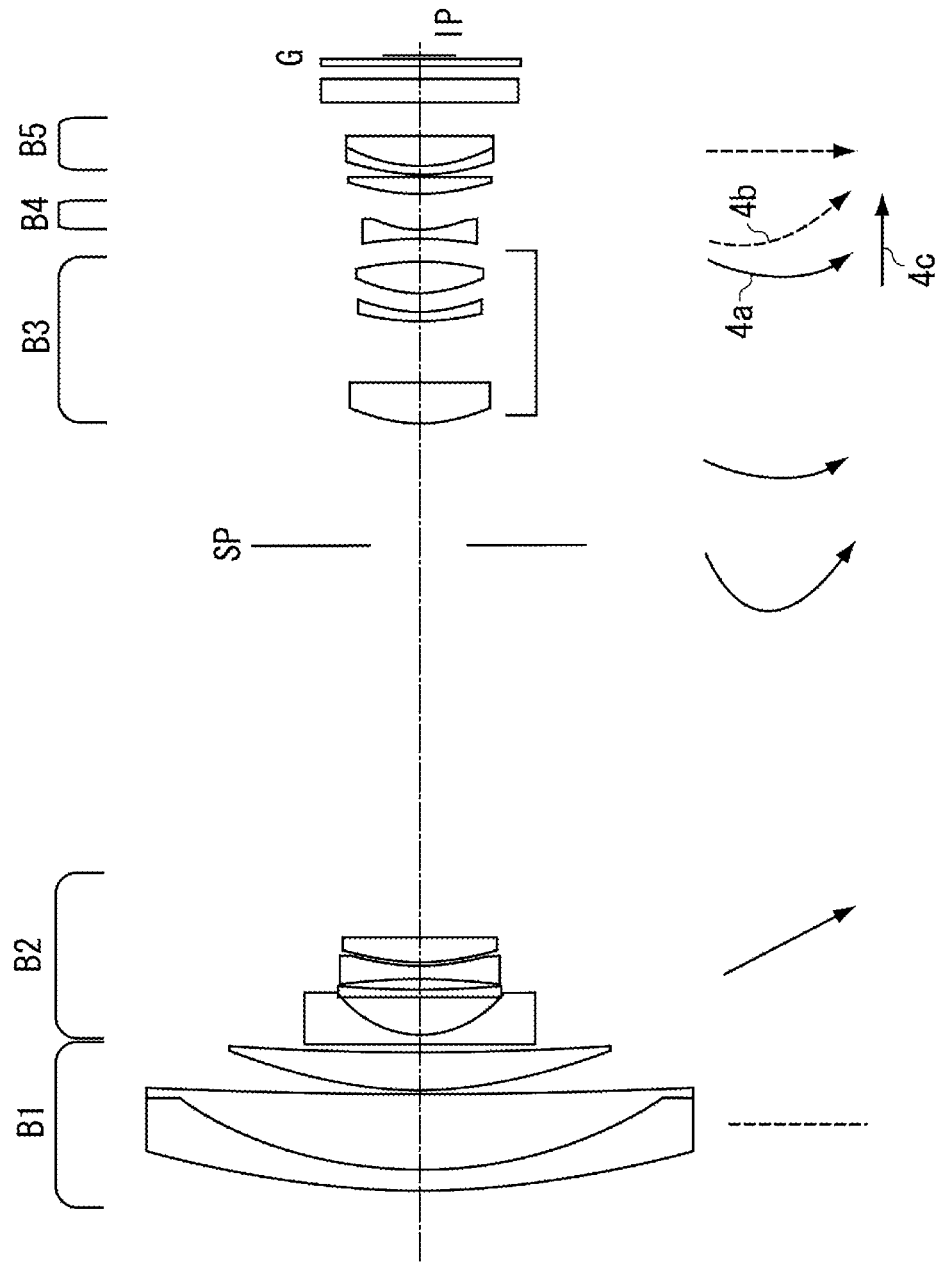

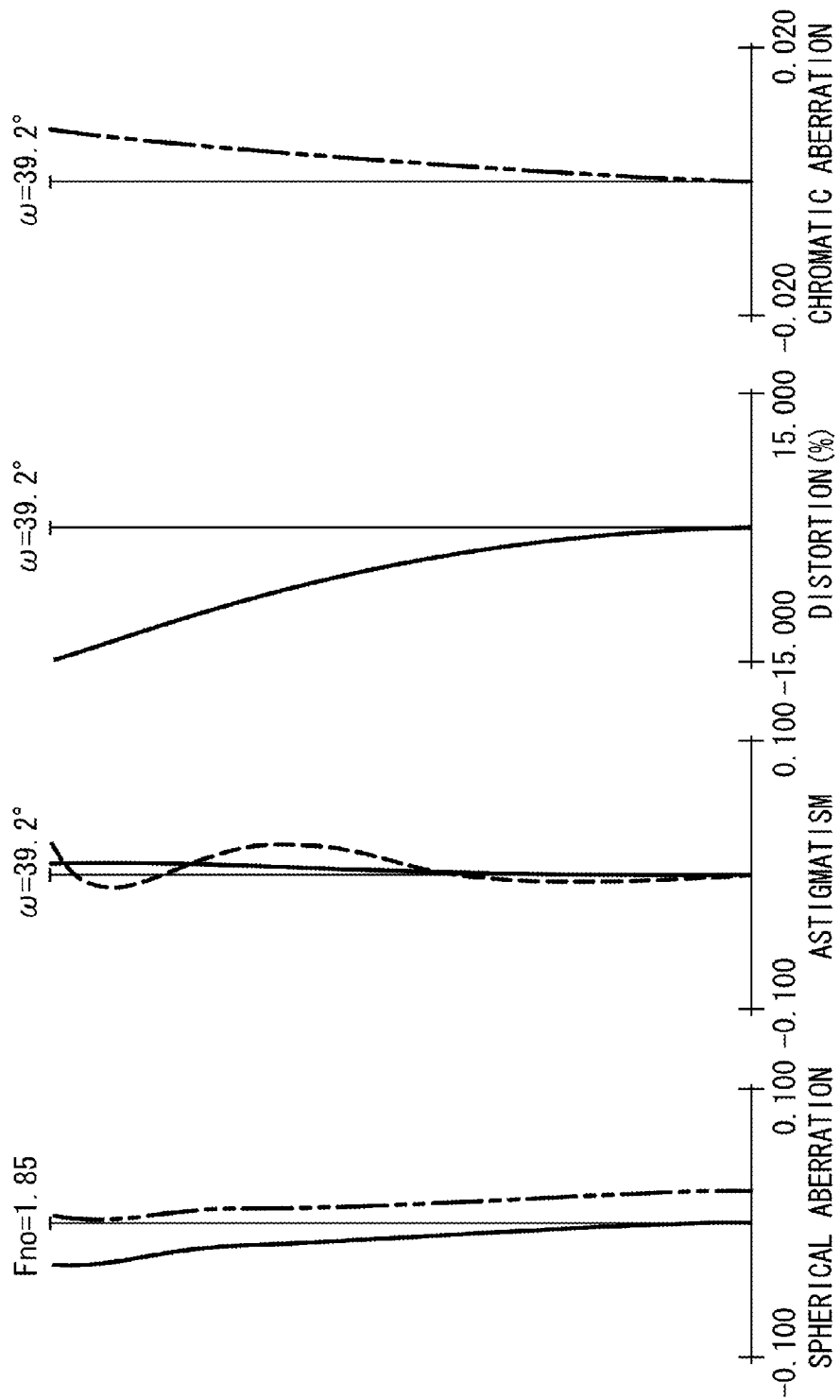

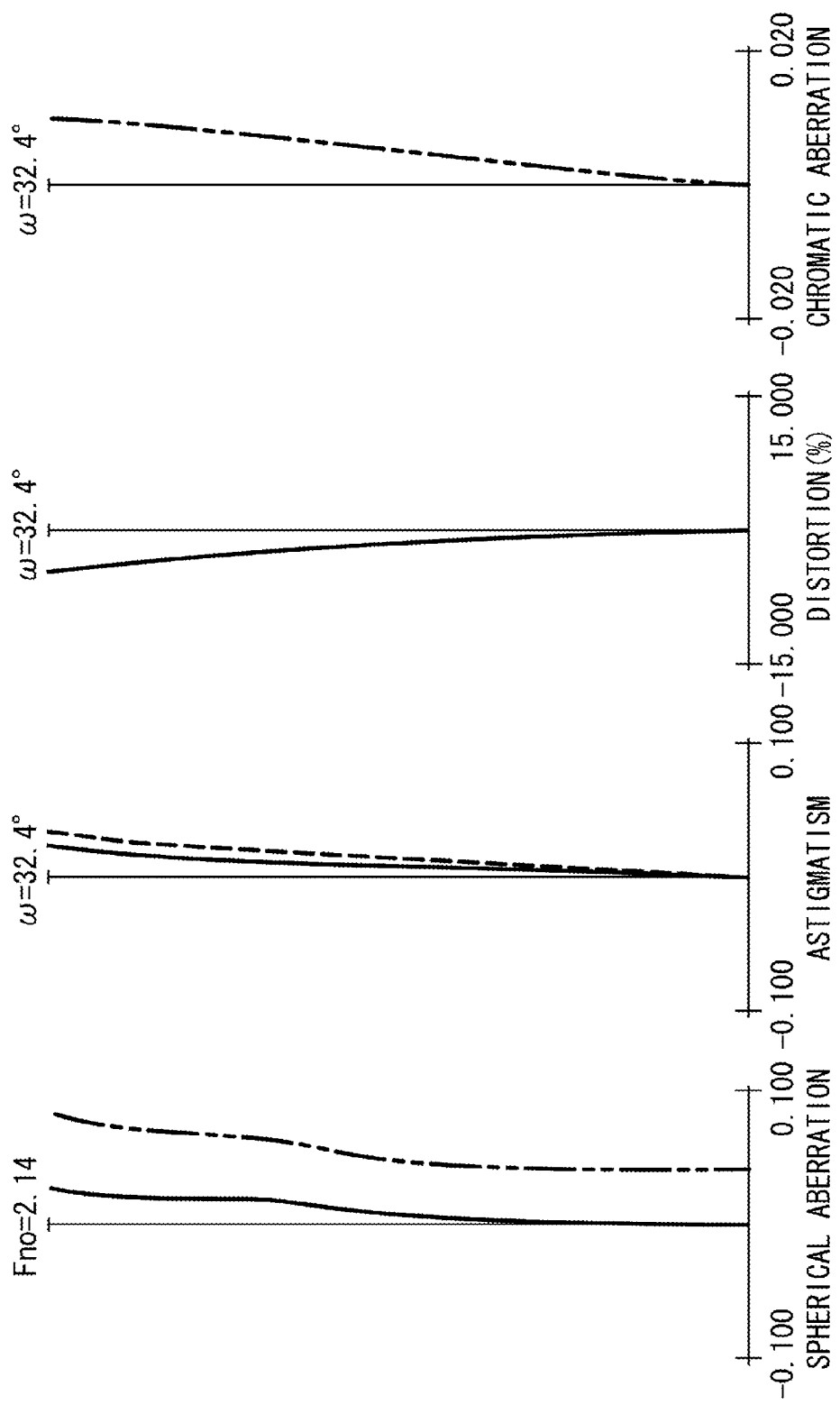

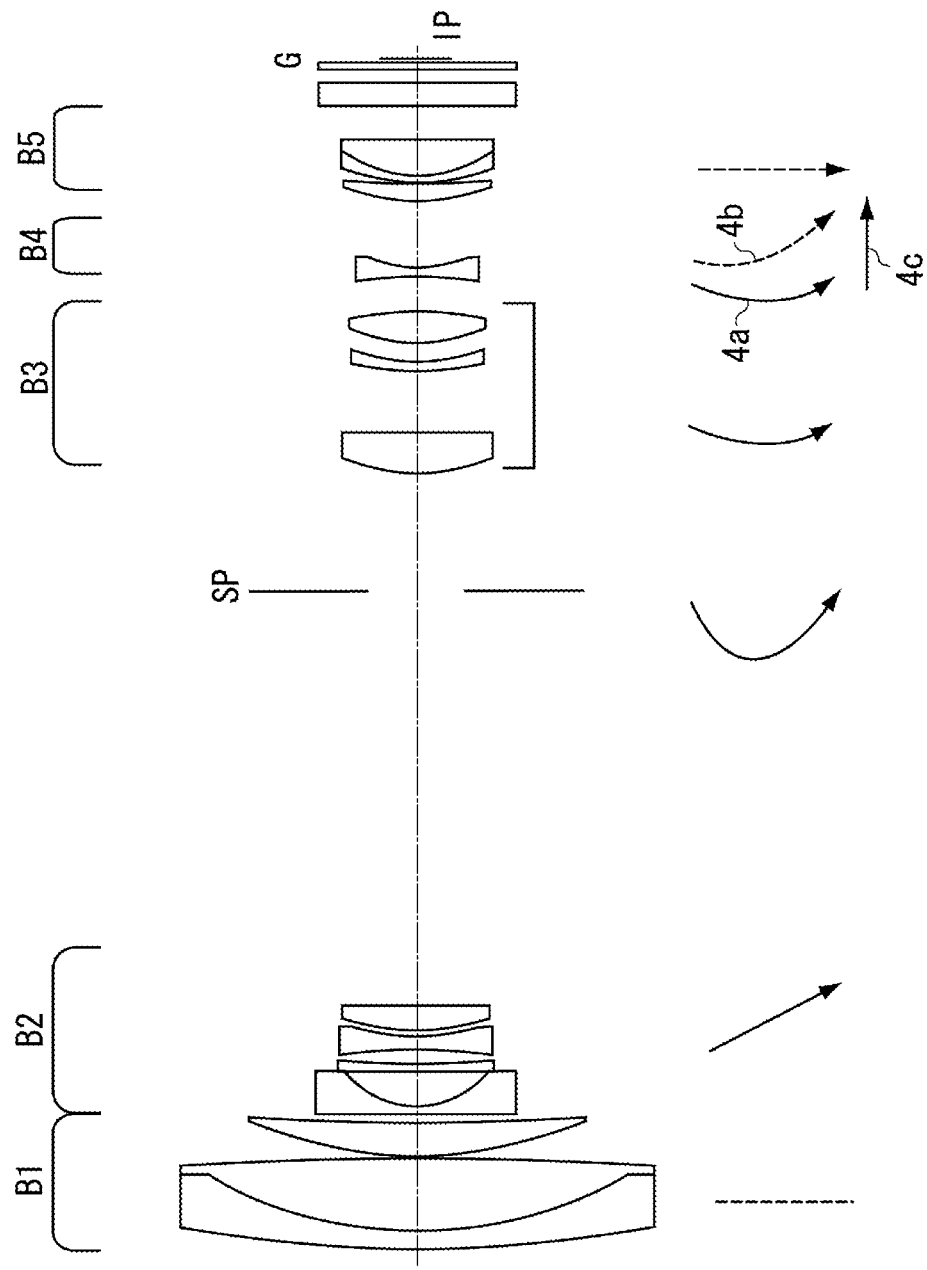

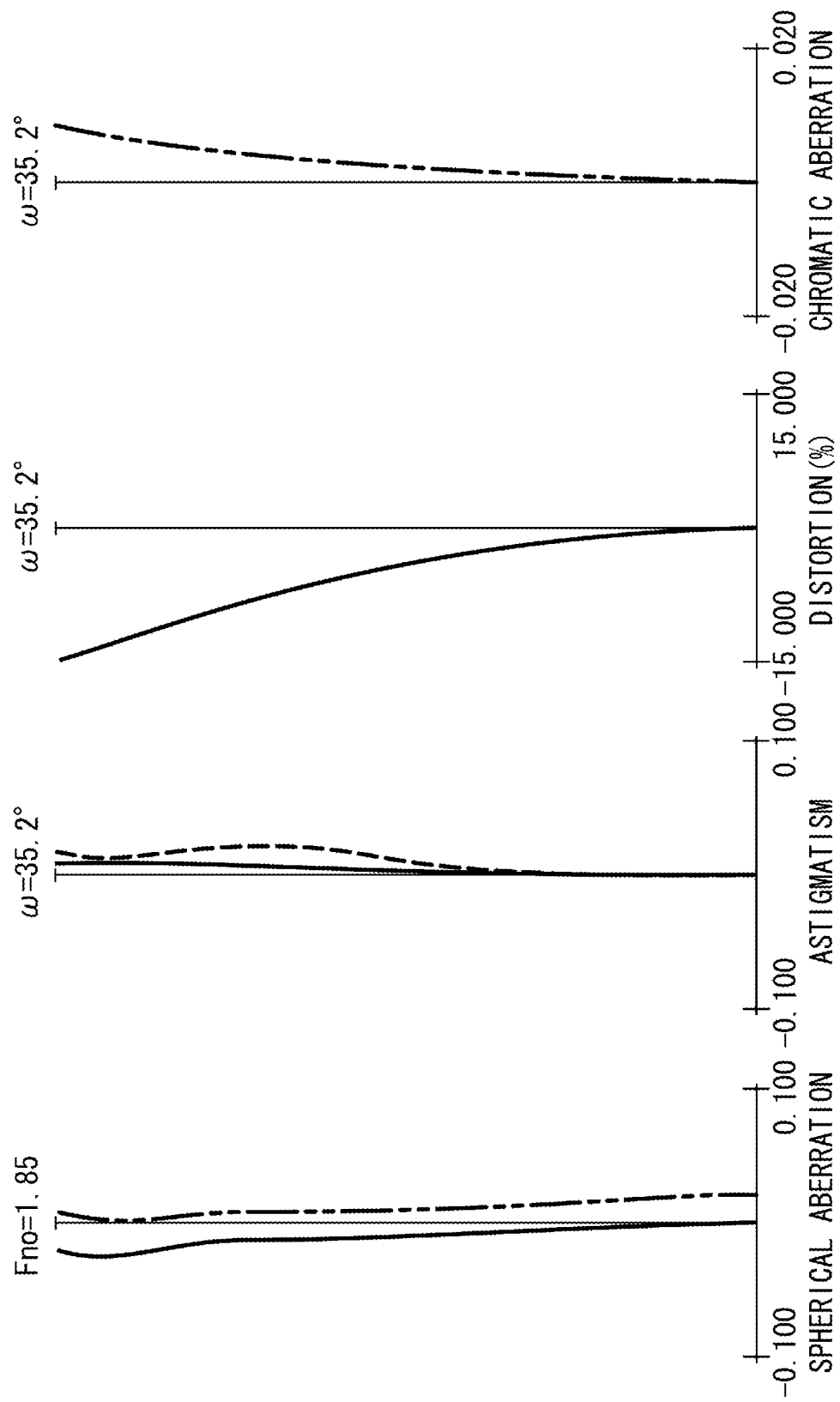

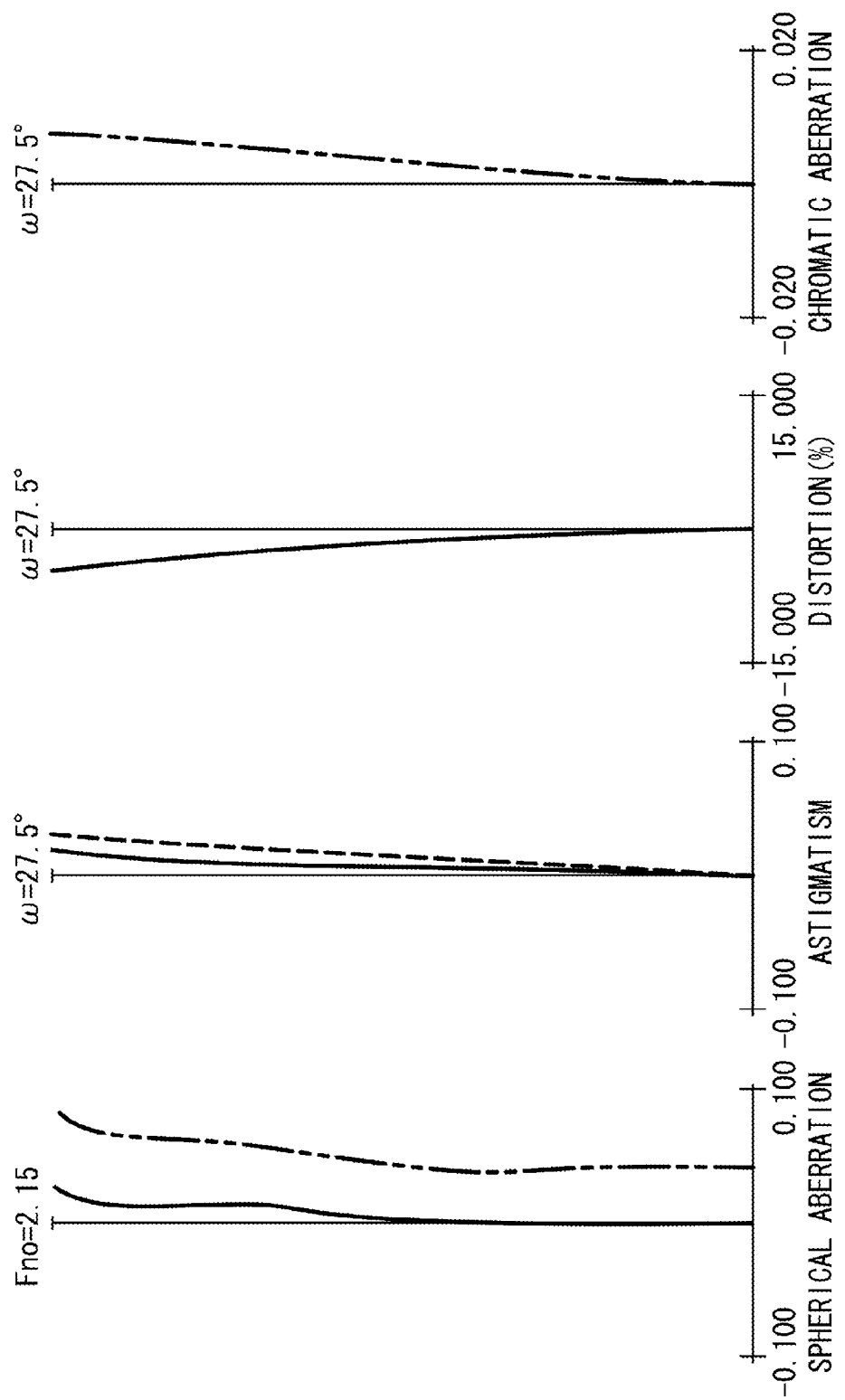

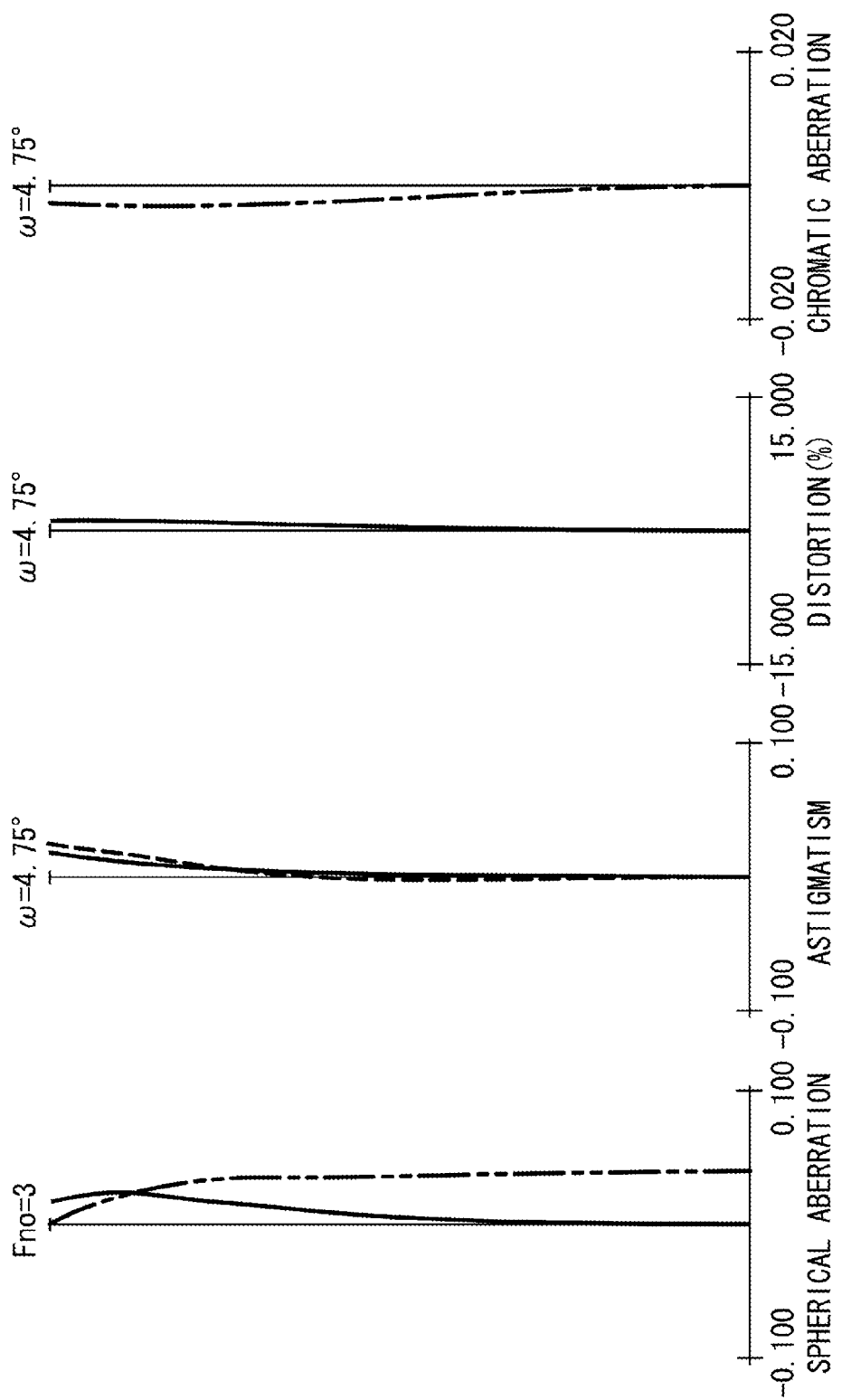

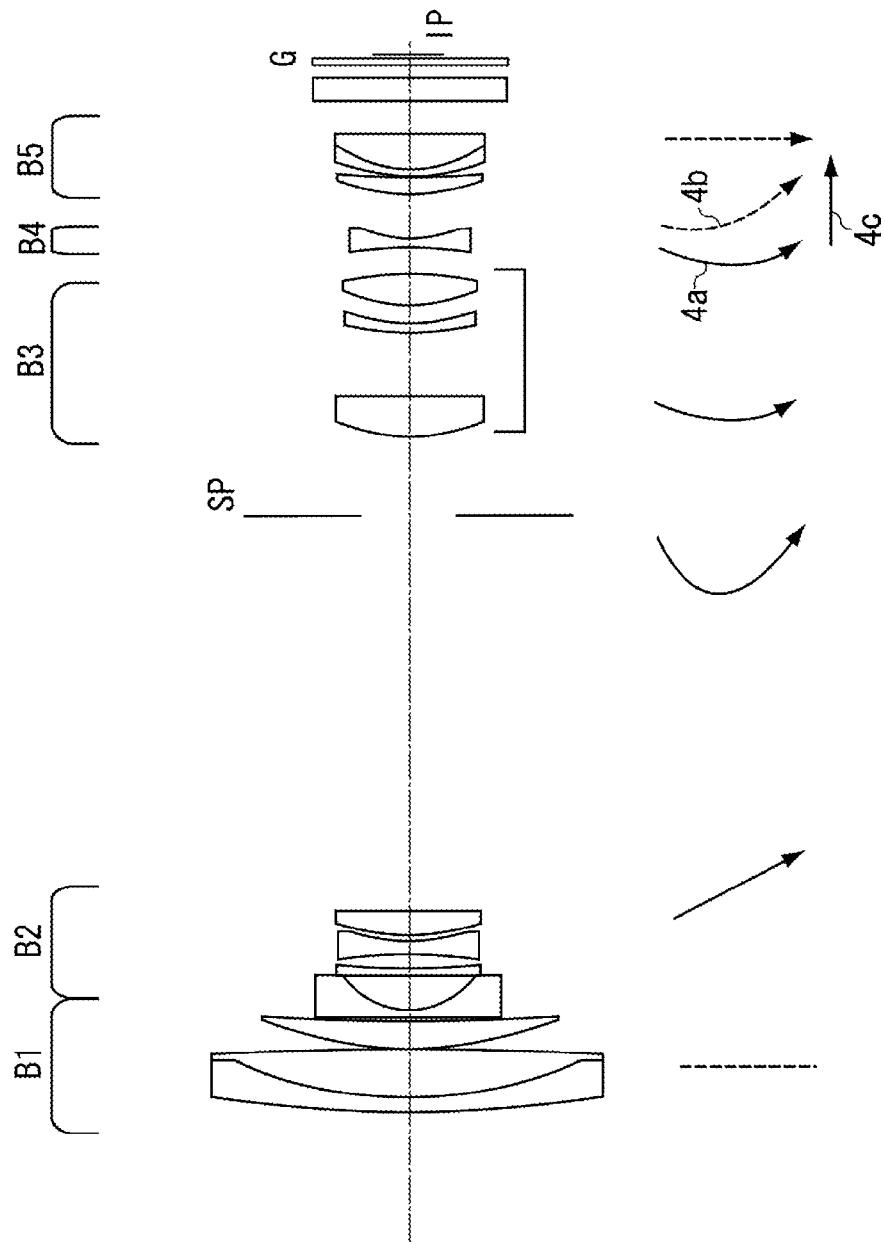

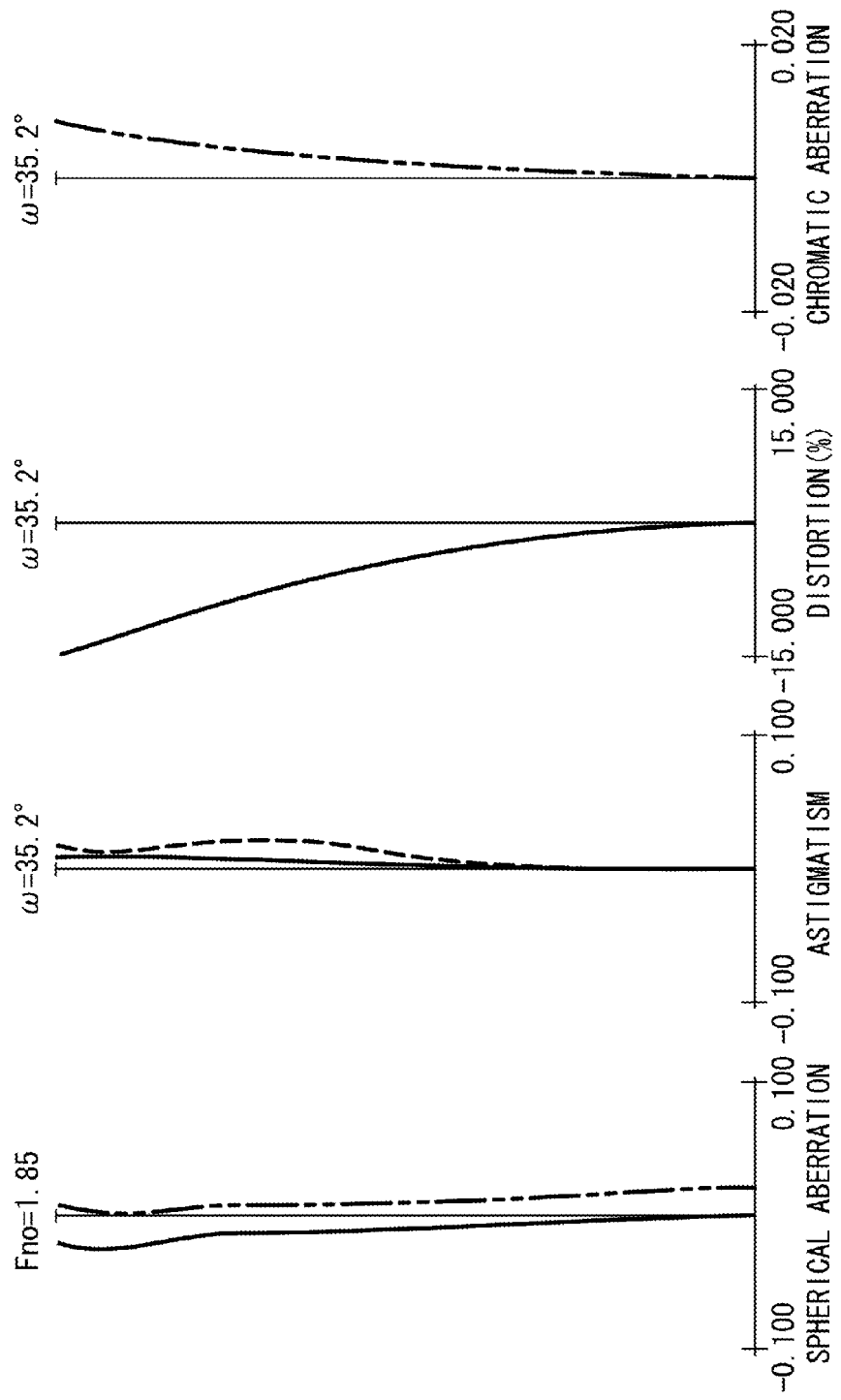

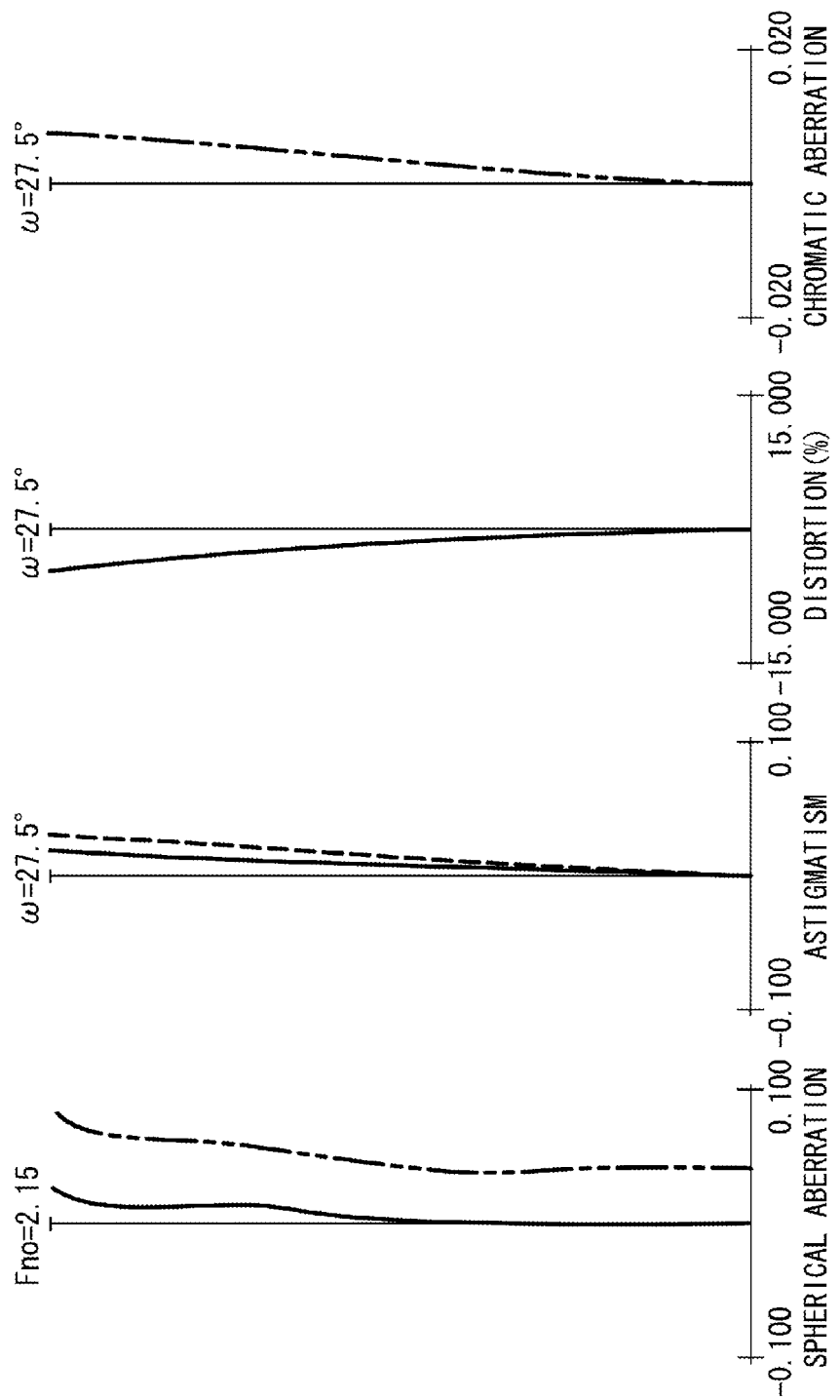

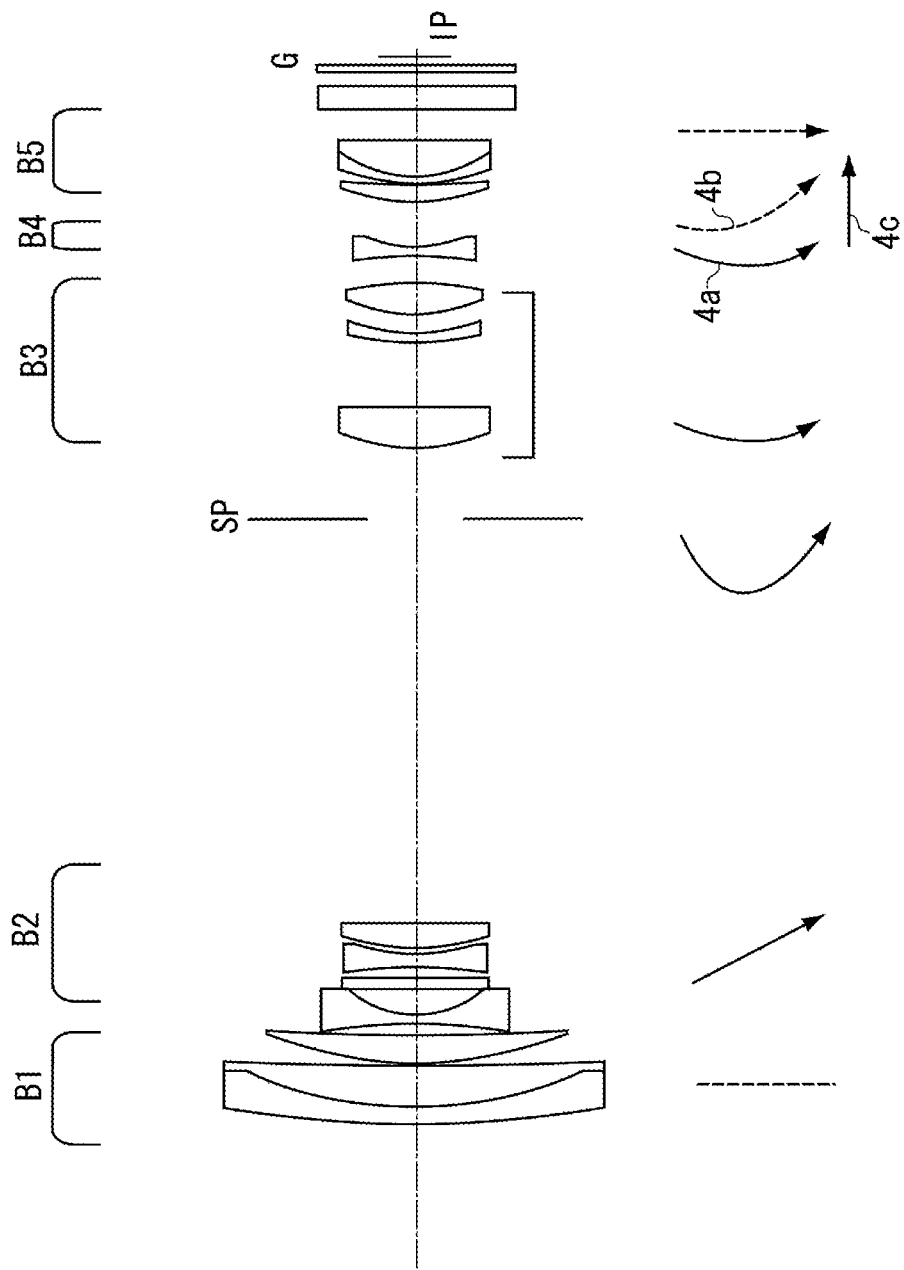

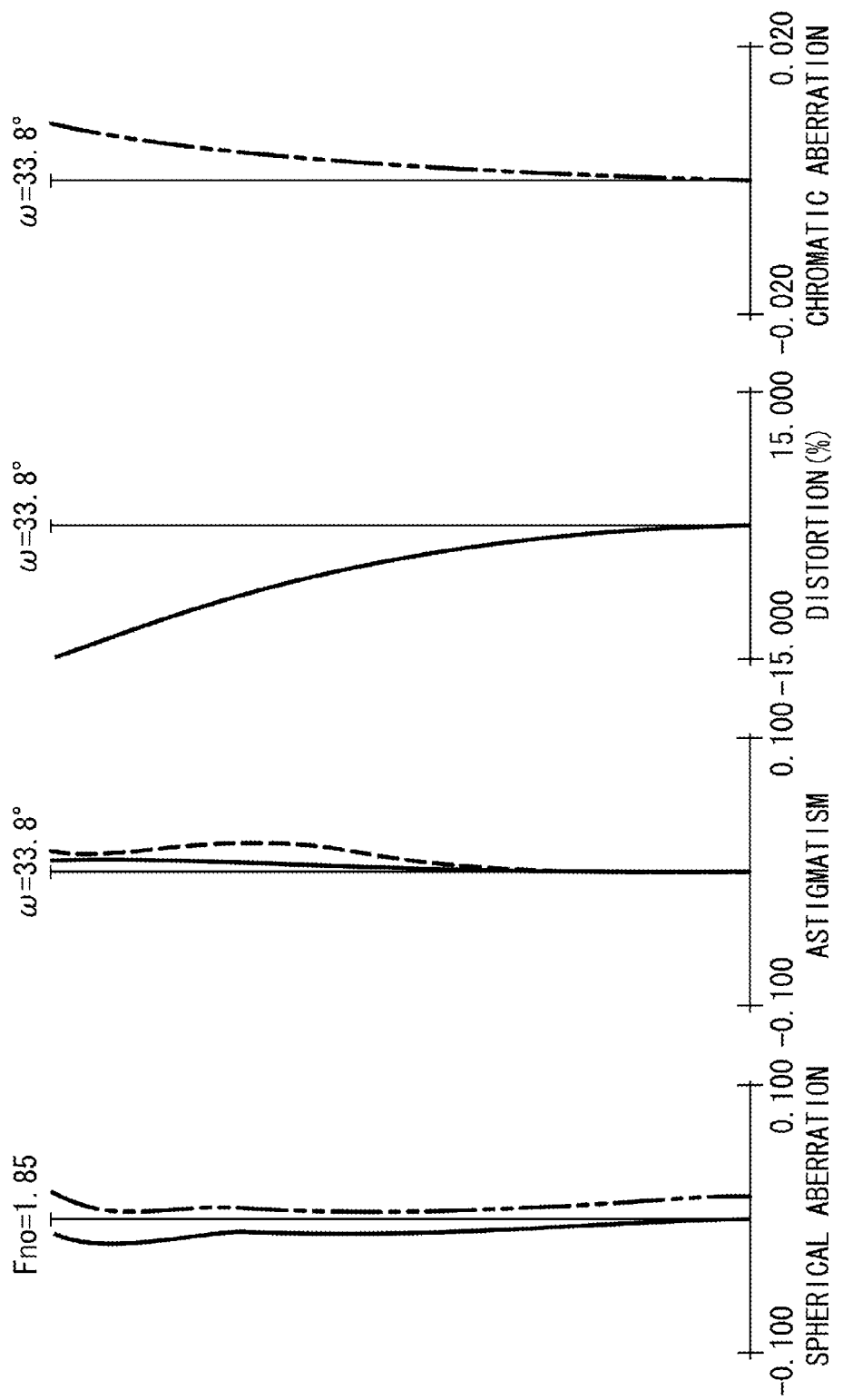

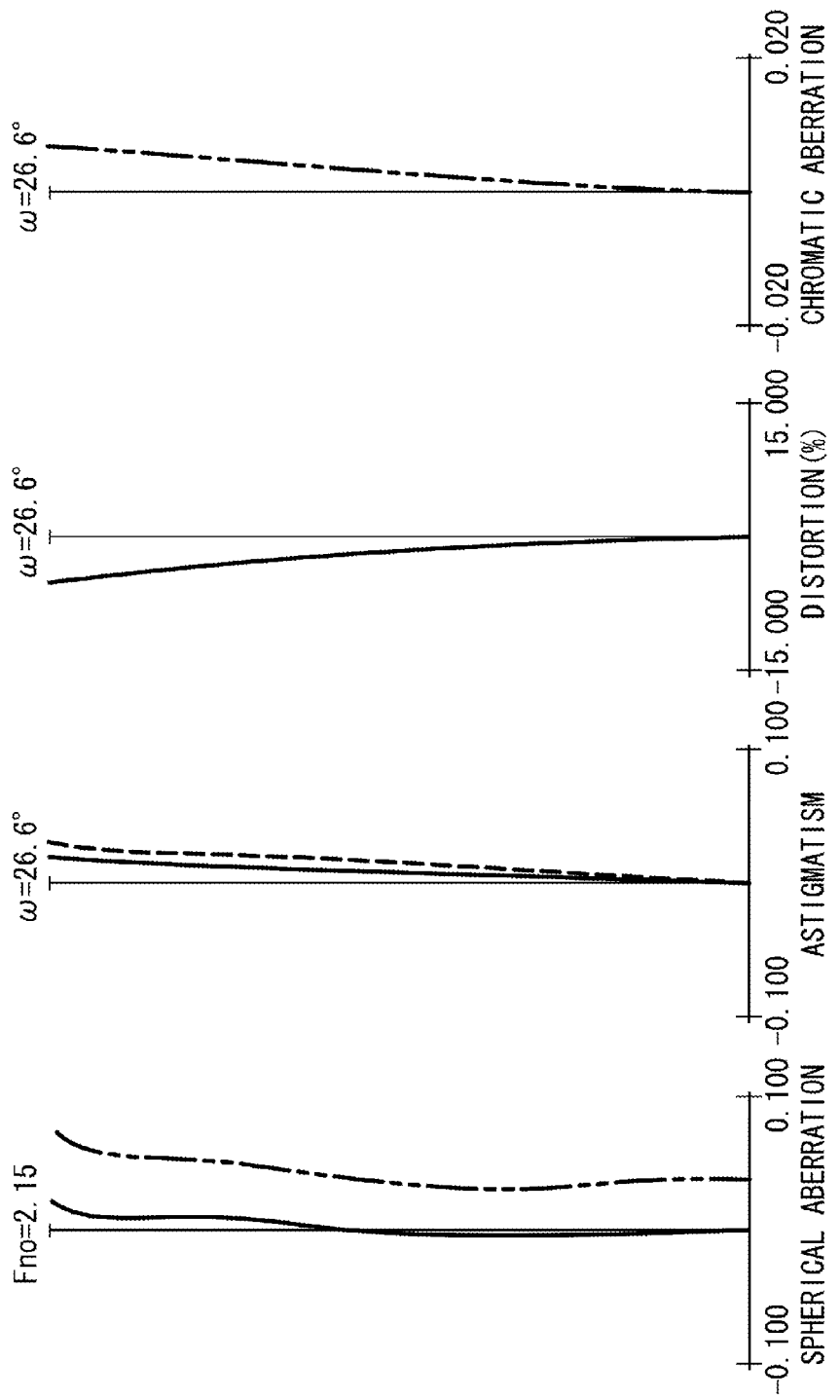

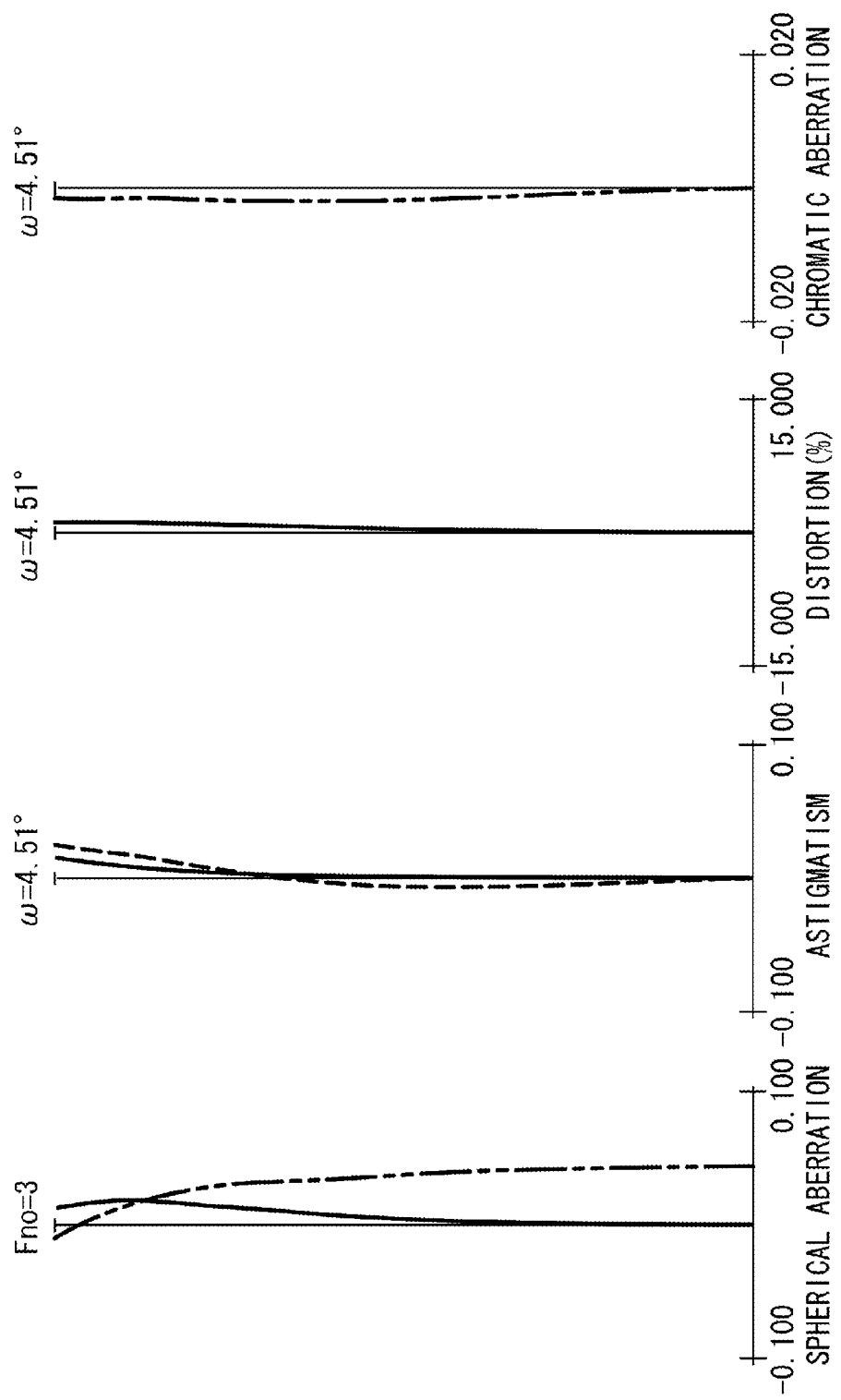

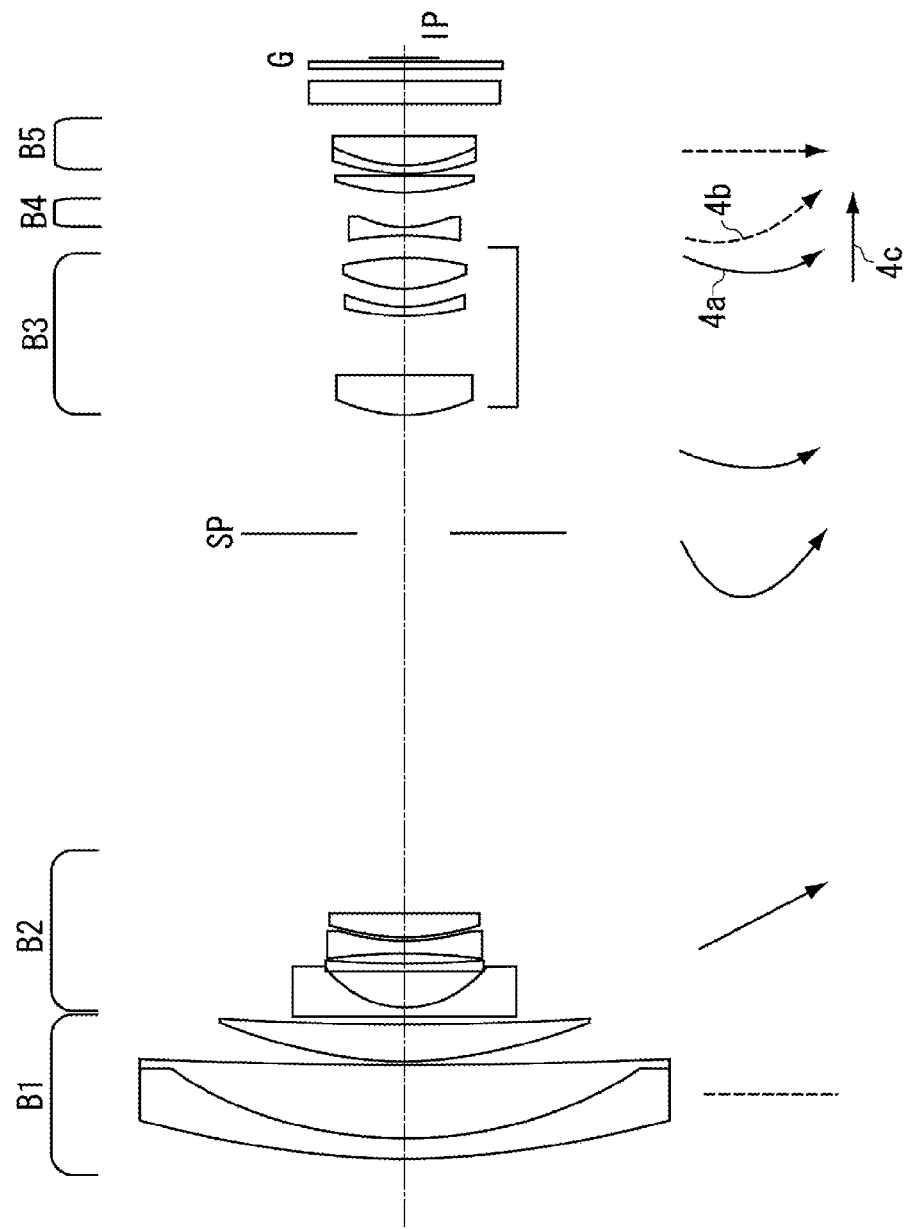

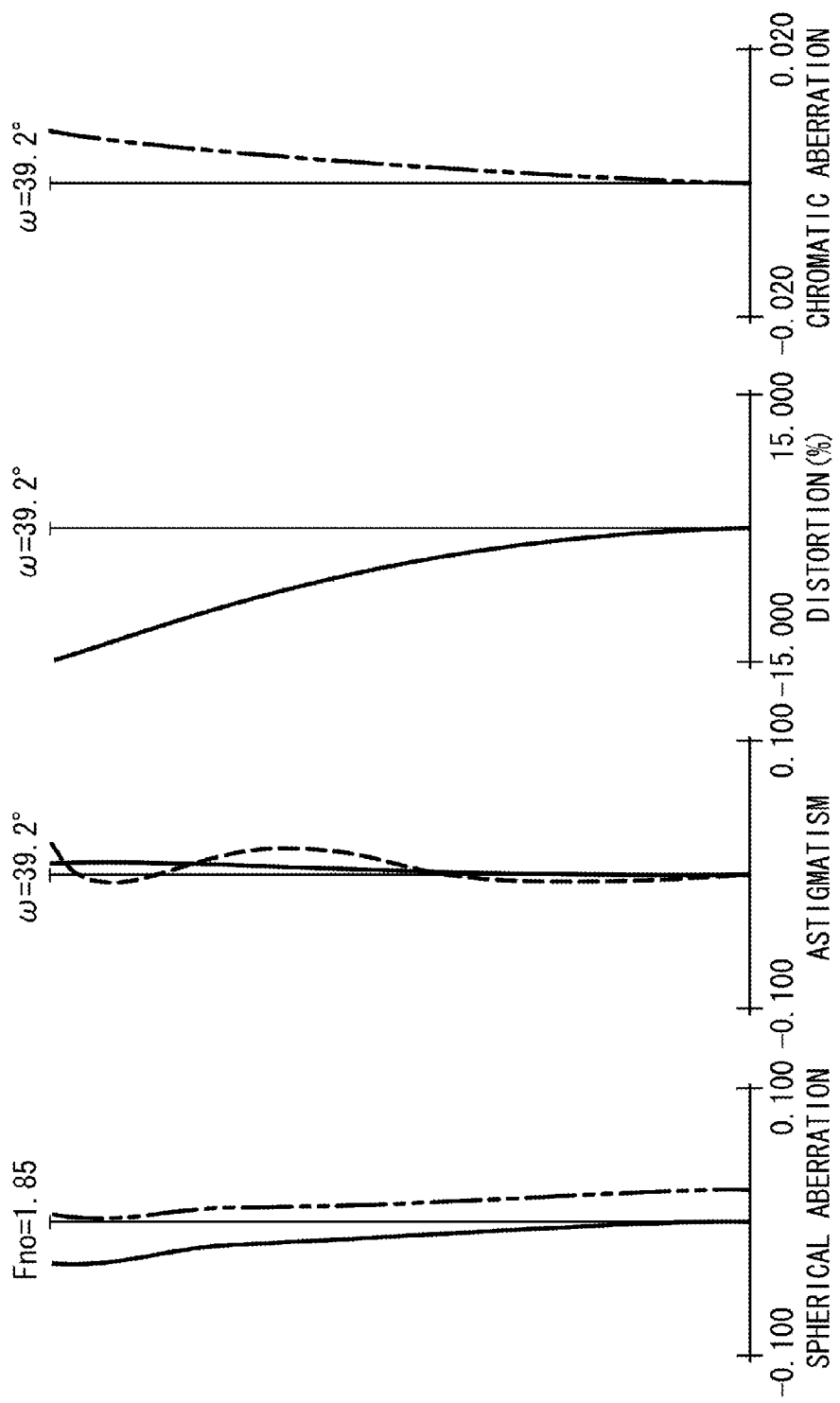

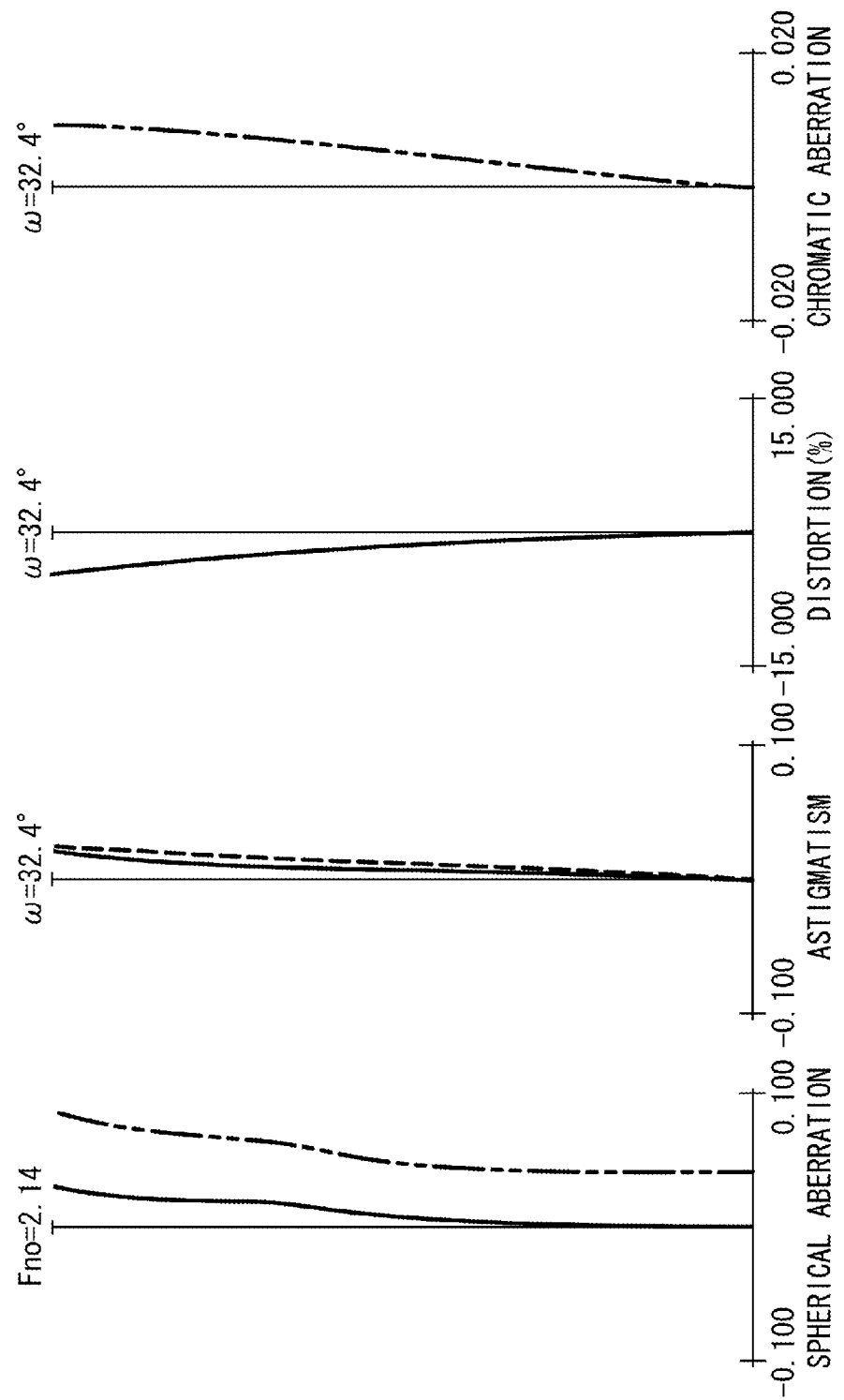

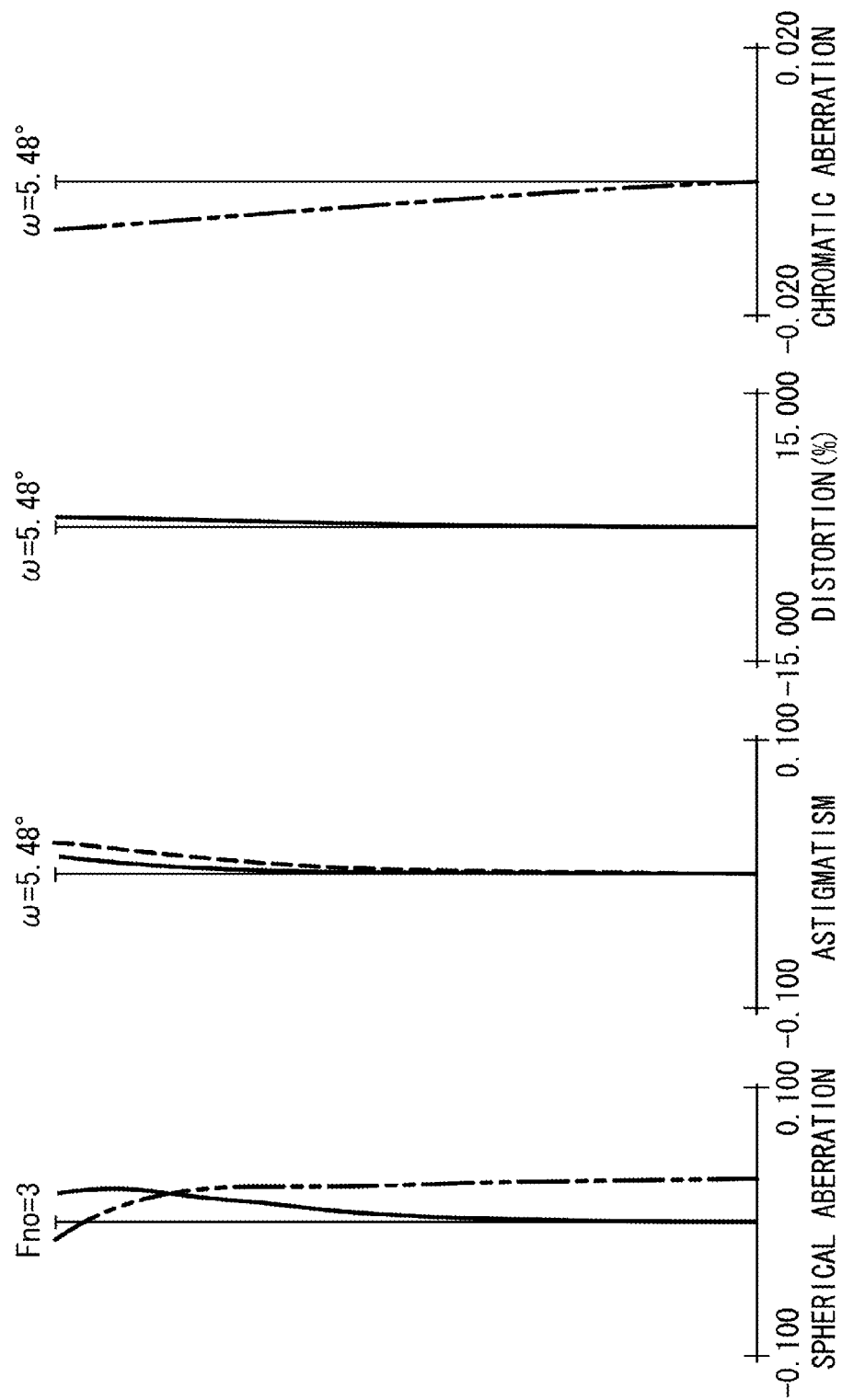

ZOOM LENS AND IMAGE PICKUP APPARATUS WITH THE ZOOM LENS

BACKGROUND OF THE INVENTION

1. Field of the Invention

The present invention relates to a zoom lens and an image pickup apparatus equipped with the zoom lens. In particular, the present invention relates to a zoom lens useful as a photographic optical system of an image pickup apparatus, such as a still camera, a video camera, a monitoring camera, and the like, and to an image pickup apparatus equipped with the zoom lens.

2. Description of the Related Art

According to current market preferences, it is desired that a photographic optical system used in an image pickup apparatus that uses a solid-state image sensor has a small F-number, a wide angle of view, and a high optical performance and be a zoom lens whose total size is small. In addition, it is desired that power necessary for a drive source, which is necessary during zooming, be reduced, a minute image shake, which may occur during zooming, be suppressed, and a first lens unit be stationary during zooming so as to increase the strength of a lens barrel.

As a positive-lead type zoom lens in which a lens unit having a positive refractive power is positioned on the object side, a five-unit zoom lens, which includes first through fifth lens units having a positive refractive power, a negative refractive power, a positive refractive power, a negative refractive power, and a positive refractive power in order from the object side to the image side, has been used. U.S. Pat. No. 5,388,004 and U.S. Pat. No. 7,609,446 discuss a small-size zoom lens having a wide angle of view. More specifically, in the zoom lens discussed in U.S. Pat. No. 5,388,004 and U.S. Pat. No. 7,609,446, a first lens unit is stationary and a plurality of lens units located on the image side move during zooming and the lens units other than the first lens unit move for focusing.

If a first lens unit is set to be stationary during zooming and the angle of view is increased while maintaining and intending a predetermined F-number and a high optical performance in a positive-lead type zoom lens, the effective diameter of the first lens unit may become extremely large. Accordingly, the total size of the lens barrel may become large.

In addition, if the refractive power of each lens unit is increased to increase the angle of view in a small-size zoom lens, the amount of various aberrations may increase to too high a level to be appropriately corrected. Accordingly, it is significant that the refractive power of each lens unit and conditions for moving each lens unit during zooming are appropriately set.

In particular, unless a condition for moving an aperture stop during zooming is appropriately set, it may become difficult to achieve a zoom lens in which the effective diameter of the front lens is small and having a wide angle of view and a high optical performance for the entire zoom range.

SUMMARY OF THE INVENTION

The present invention is directed to a small-size zoom lens having a wide angle of view and a small effective diameter of a front lens and to an image pickup apparatus equipped with the zoom lens.

According to an aspect of the present invention, a zoom lens includes, in order from an object side to an image side, a first lens unit having a positive refractive power, a second lens unit having a negative refractive power, an aperture stop, a third lens unit having a positive refractive power, a fourth lens unit having a negative refractive power, and a fifth lens unit having a positive refractive power. In the zoom lens, during zooming from a wide-angle end to a telephoto end, the first lens unit is configured to remain stationary, the second lens unit, the third lens unit, and the fourth lens unit are configured to move separately from one another and, the aperture stop is configured to move along a locus convex towards the object side.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 1A, 1B, and 1C are lens cross sectional views of a zoom lens at a wide-angle end, at a middle zoom position, and at a telephoto end, respectively, according to a first exemplary embodiment of the present invention.

FIGS. 2A, 2B, and 2C are aberration charts of the zoom lens at the wide-angle end, at the middle zoom position, and at the telephoto end, respectively, according to the first exemplary embodiment of the present invention.

FIGS. 3A, 3B, and 3C are lens cross sectional views of a zoom lens at a wide-angle end, at a middle zoom position, and at a telephoto end, respectively, according to a second exemplary embodiment of the present invention.

FIGS. 4A, 4B, and 4C are aberration charts of the zoom lens at the wide-angle end, at the middle zoom position, and at the telephoto end, respectively, according to the second exemplary embodiment of the present invention.

FIGS. 5A, 5B, and 5C are lens cross sectional views of a zoom lens at a wide-angle end, at a middle zoom position, and at a telephoto end, respectively, according to a third exemplary embodiment of the present invention.

FIGS. 6A, 6B, and 6C are aberration charts of the zoom lens at the wide-angle end, at the middle zoom position, and at the telephoto end, respectively, according to the third exemplary embodiment of the present invention.

FIGS. 7A, 7B, and 7C are lens cross sectional views of a zoom lens at a wide-angle end, at a middle zoom position, and at a telephoto end, respectively, according to a fourth exemplary embodiment of the present invention.

FIGS. 8A, 8B, and 8C are aberration charts of the zoom lens at the wide-angle end, at the middle zoom position, and at the telephoto end, respectively, according to the fourth exemplary embodiment of the present invention.

FIGS. 9A, 9B, and 9C are lens cross sectional views of a zoom lens at a wide-angle end, at a middle zoom position, and at a telephoto end, respectively, according to a fifth exemplary embodiment of the present invention.

FIGS. 10A, 10B, and 10C are aberration charts of the zoom lens at the wide-angle end, at the middle zoom position, and at the telephoto end, respectively, according to the fifth exemplary embodiment of the present invention.

DESCRIPTION OF THE EMBODIMENTS

Various exemplary embodiments, features, and aspects of the invention will be described in detail below with reference to the drawings. As used herein, the side of a lens where an object to be imaged is located is referred to as the "object side" or front side of the lens; and the side of the lens where the image of the object is formed is referred to as the "image side" or back side of the lens.

A zoom lens according to an exemplary embodiment of the present invention includes, in order from the object side to the image side, a first lens unit having a positive refractive power, a second lens unit having a negative refractive power, an aperture stop, a third lens unit having a positive refractive power, a fourth lens unit having a negative refractive power, and a fifth lens unit having a positive refractive power. During zooming, the first lens unit is stationary and the second through the fourth lens units and the aperture stop move. During zooming, the aperture stop moves along a locus convex towards the object side. A lens unit having a refractive power can be located on at least one of the object side of the fifth lens unit and the image side of the fifth lens unit.

Figure 1B:
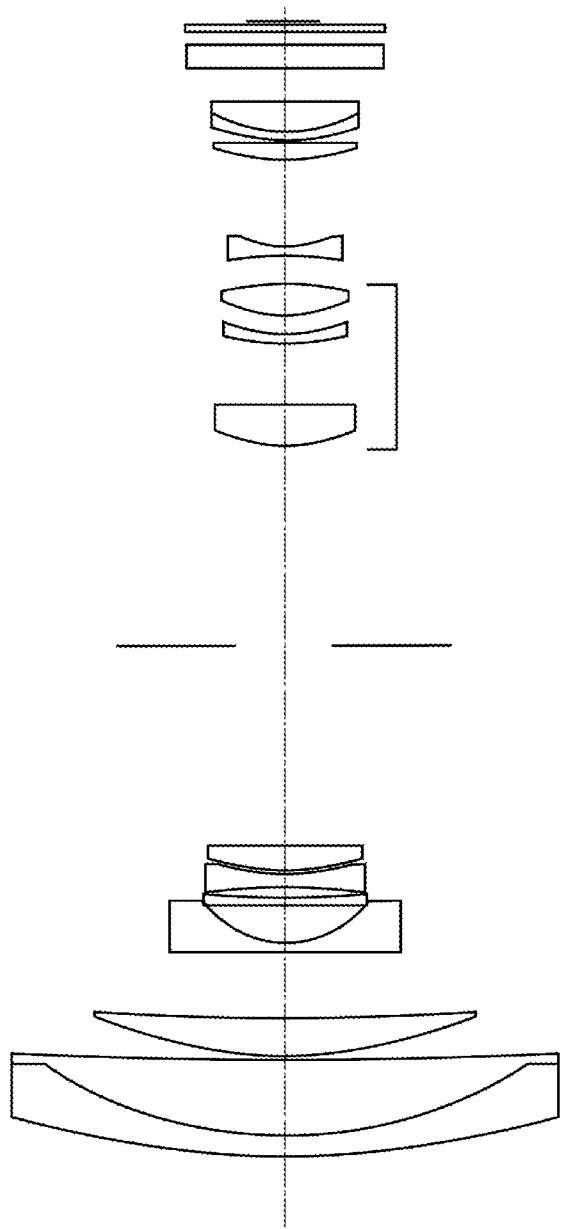
Figure 1C:
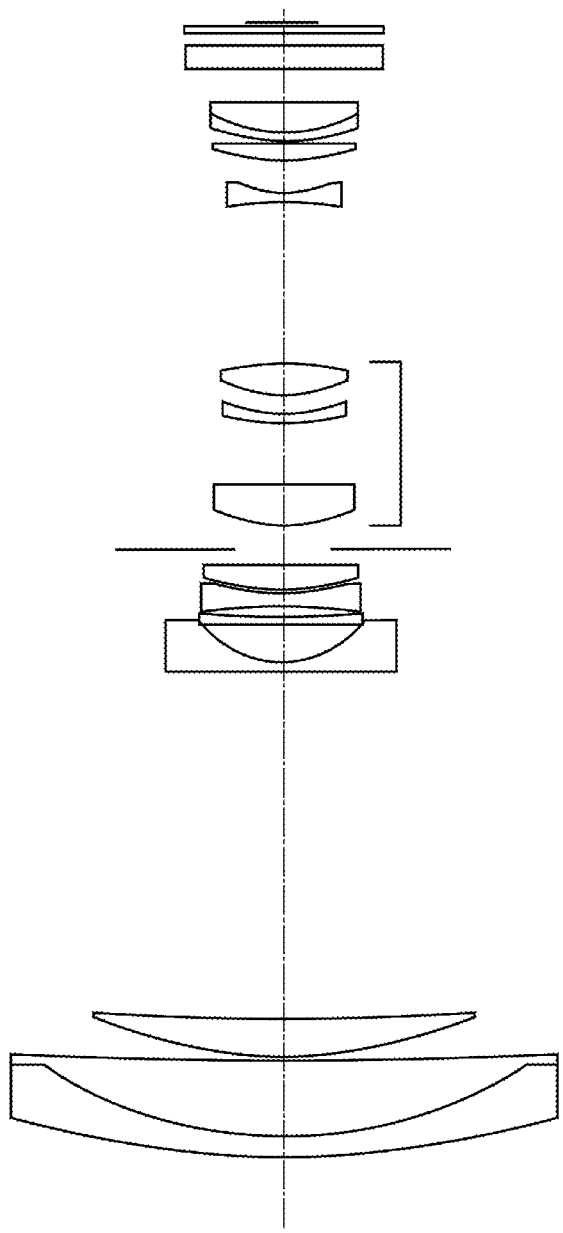
Figure 2C:
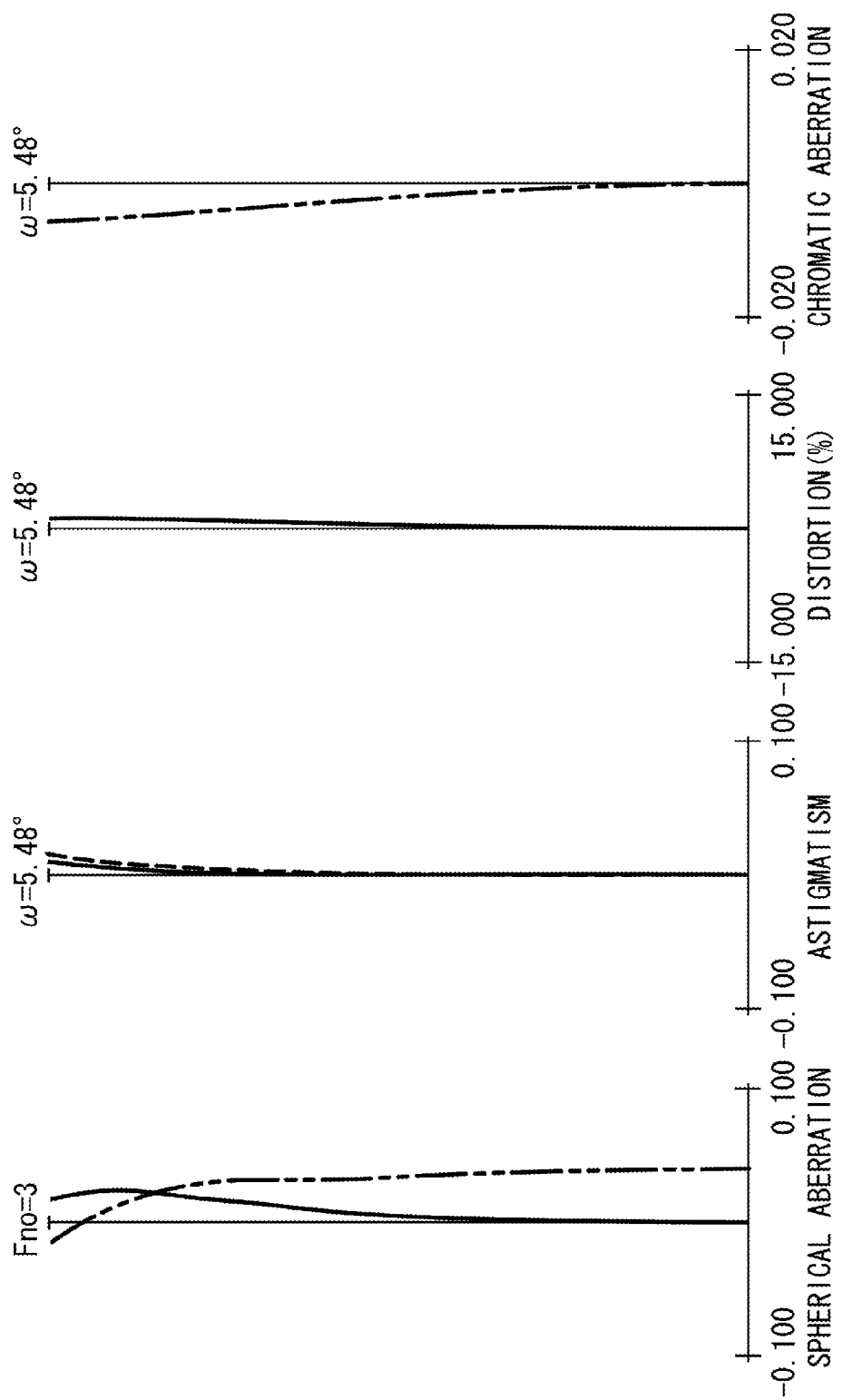

FIGS. 1A through 1C are lens cross sectional views of a zoom lens according to a first exemplary embodiment at a wide-angle end (a short focal length end), at a middle zoom position, and at a telephoto end (a long focal length end). FIGS. 2A through 2C are aberration charts of the zoom lens according to the first exemplary embodiment at the wide-angle end, at the middle zoom position, and at the telephoto end. The first exemplary embodiment is a zoom lens having a zoom ratio of 10.00, an aperture ratio (F-number) ranging from 1.85 to 3.00, and an imaging angle of view ranging from 78.34° to 10.96°.

Figure 3B:
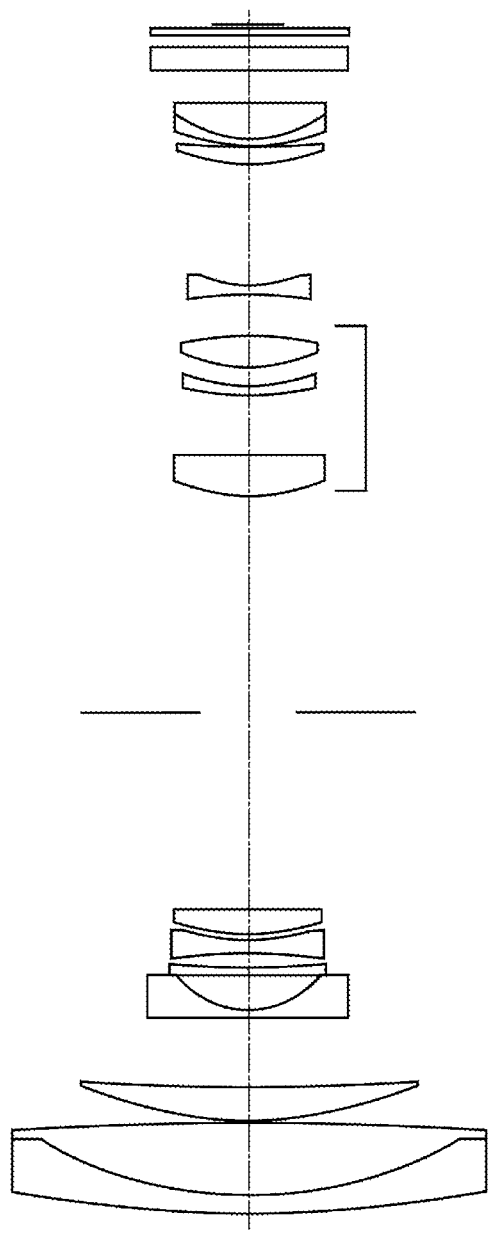
Figure 3C:
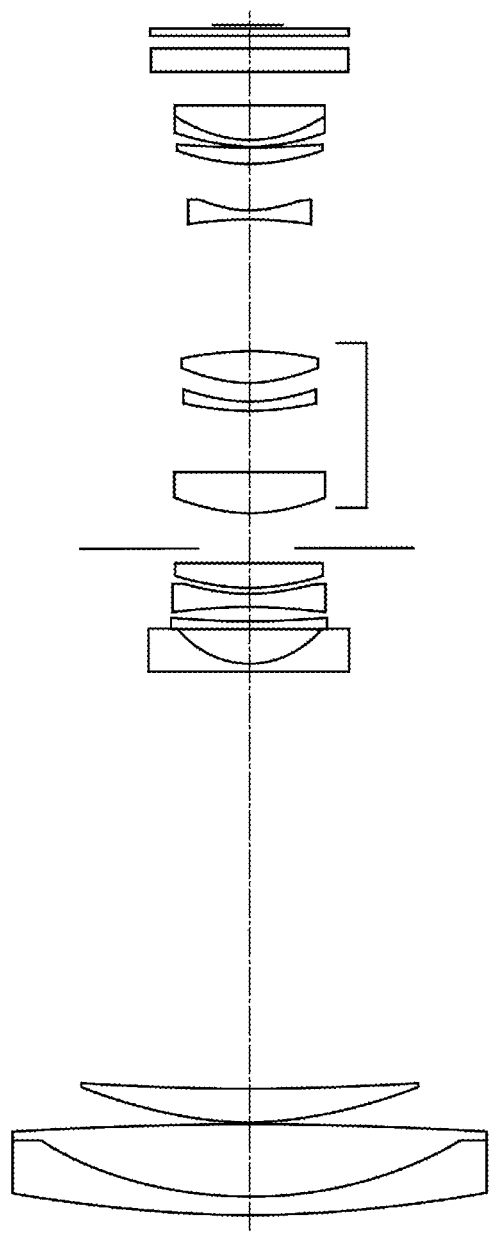

FIGS. 3A through 3C are lens cross sectional views of a zoom lens according to a second exemplary embodiment at a wide-angle end, at a middle zoom position, and at a telephoto end. FIGS. 4A through 4C are aberration charts of the zoom lens according to the second exemplary embodiment at the wide-angle end, at the middle zoom position, and at the telephoto end. The second exemplary embodiment is a zoom lens having a zoom ratio of 15.00, an aperture ratio (F-number) ranging from 1.85 to 3.00, and an imaging angle of view ranging from 71.82° to 65°.

Figure 5B:
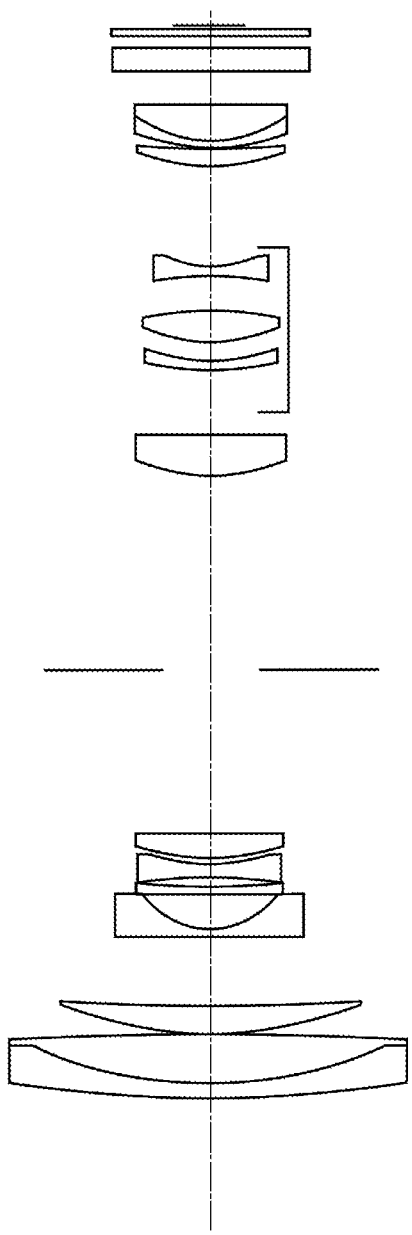
Figure 5C:
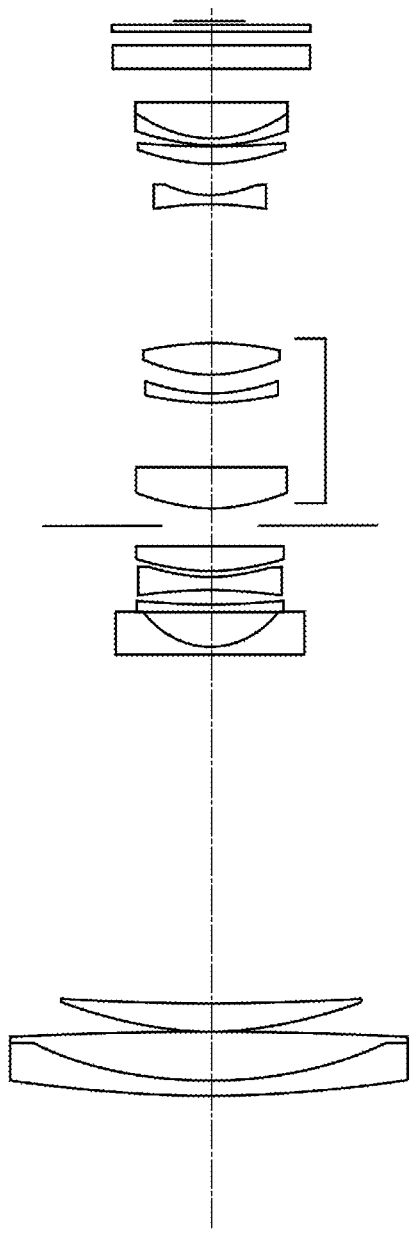
Figure 6C:
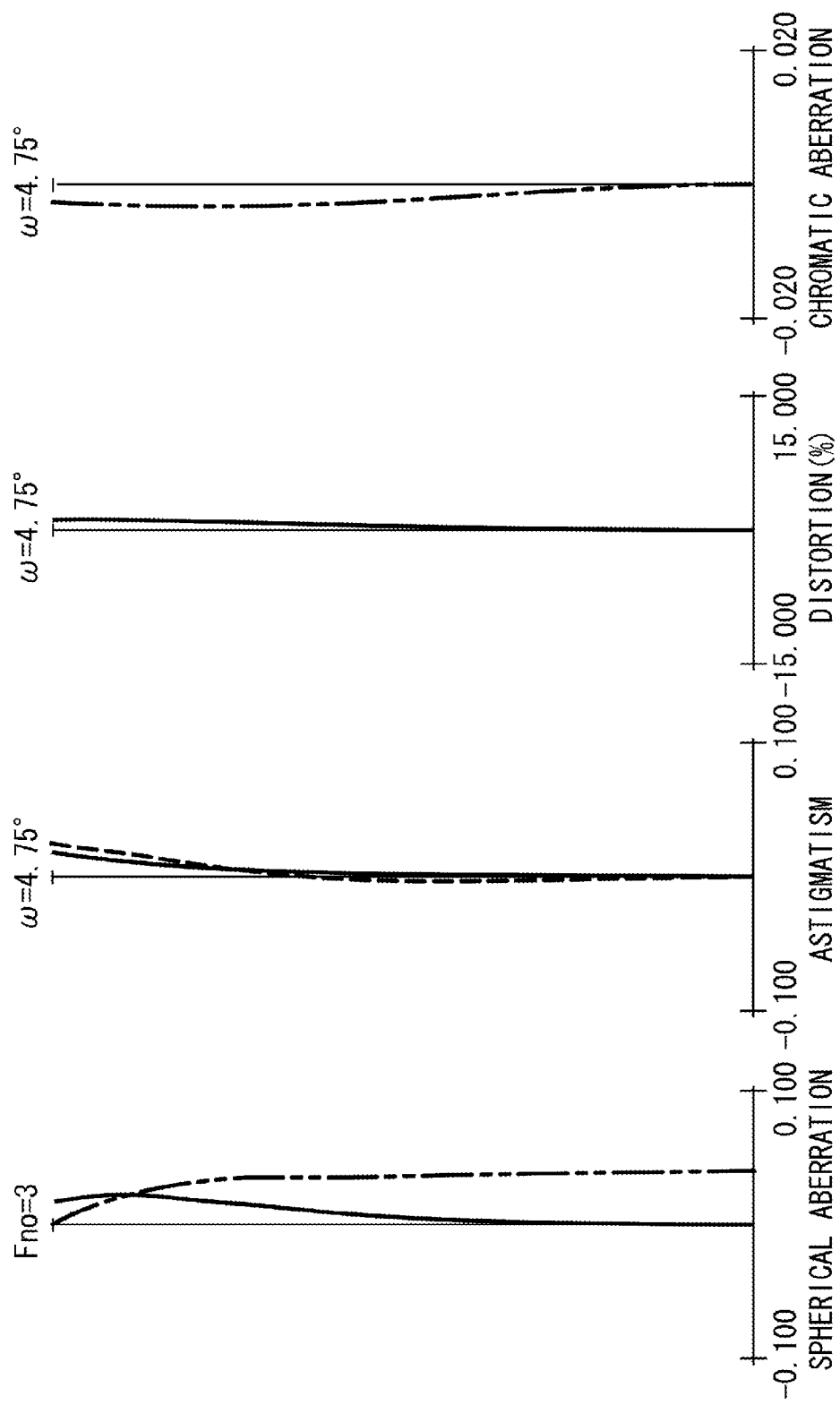

FIGS. 5A through 5C are lens cross sectional views of a zoom lens according to a third exemplary embodiment at a wide-angle end, at a middle zoom position, and at a telephoto end. FIGS. 6A through 6C are aberration charts of the zoom lens according to the third exemplary embodiment at the wide-angle end, at the middle zoom position, and at the telephoto end. The third exemplary embodiment is a zoom lens having a zoom ratio of 10.00, an aperture ratio (F-number) ranging from 1.85 to 3.00, and an imaging angle of view ranging from 70.48° to 9.5°.

Figure 7B:
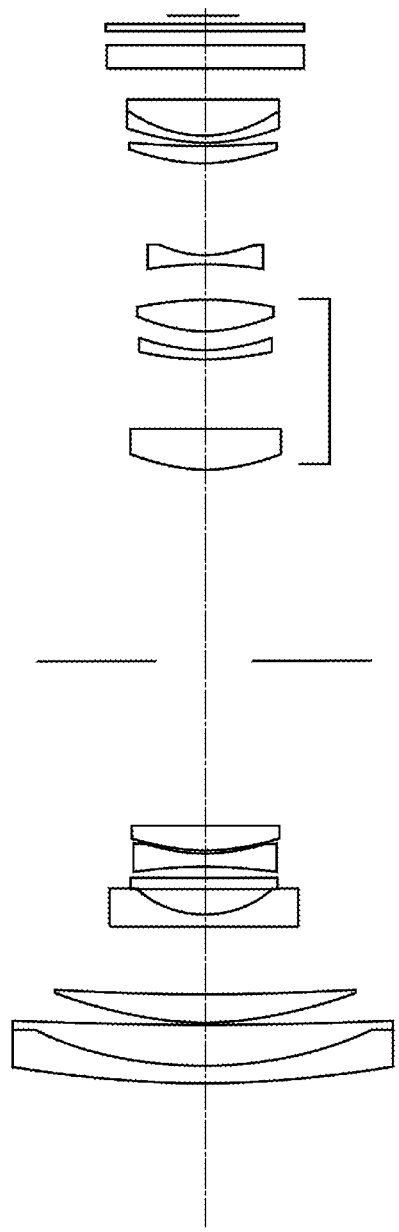
Figure 7C:
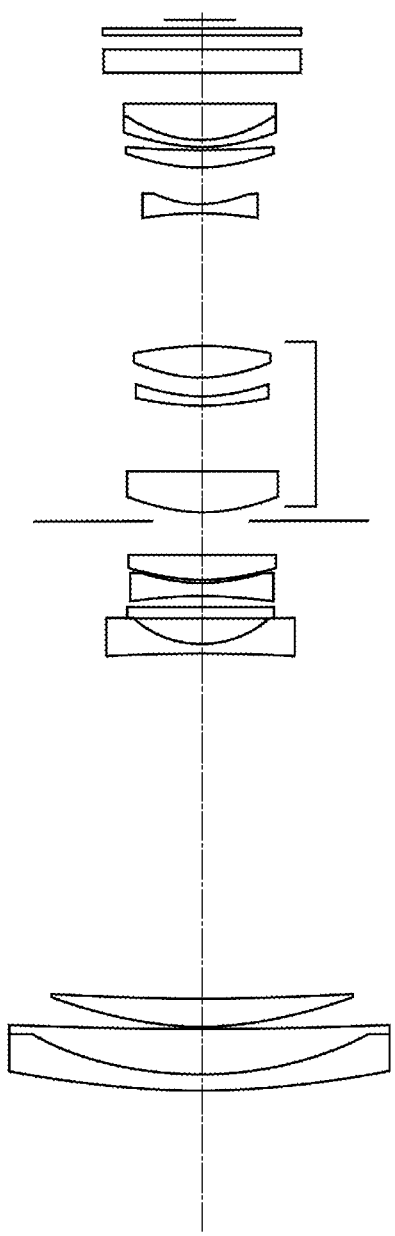

FIGS. 7A through 7C are lens cross sectional views of a zoom lens according to a fourth exemplary embodiment at a wide-angle end, at a middle zoom position, and at a telephoto end. FIGS. 8A through 8C are aberration charts of the zoom lens according to the fourth exemplary embodiment at the wide-angle end, at the middle zoom position, and at the tele-photo end. The fourth exemplary embodiment is a zoom lens having a zoom ratio of 10.05, an aperture ratio (F-number) ranging from 1.85 to 3.00, and an imaging angle of view ranging from 67.62° to 8.96°.

Figure 9B:
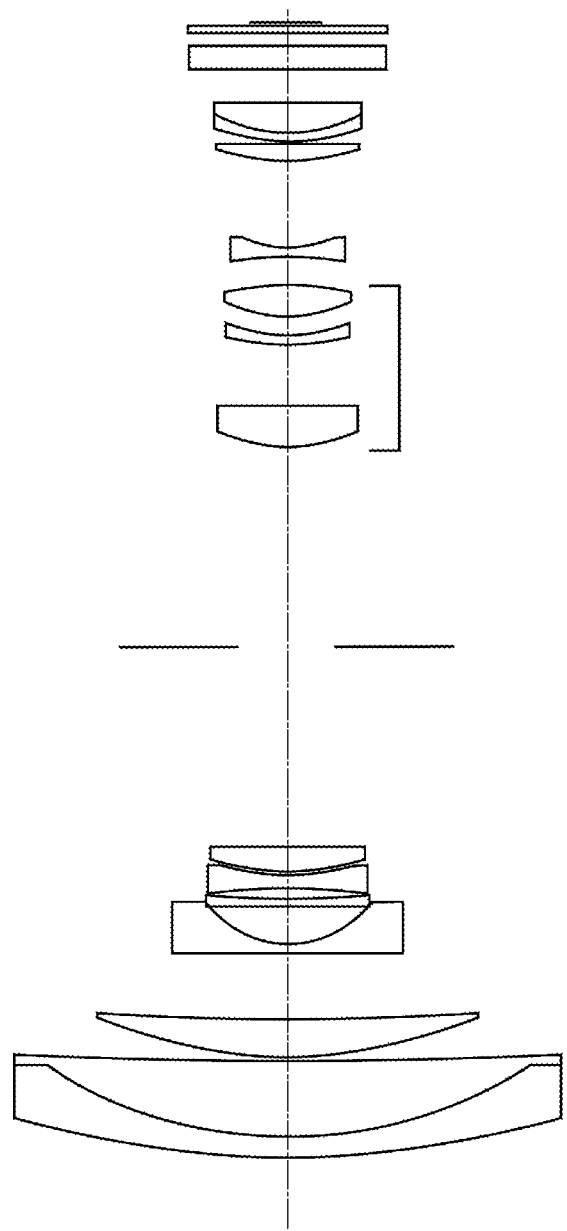
Figure 9C:
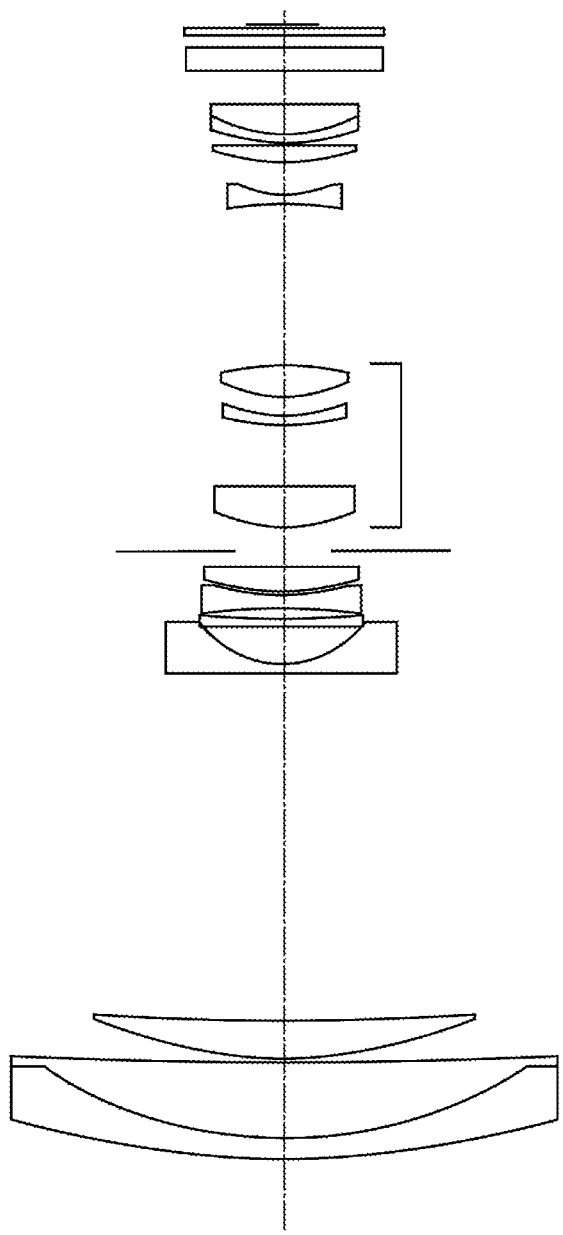

FIGS. 9A through 9C are lens cross sectional views of a zoom lens according to a fifth exemplary embodiment at a wide-angle end, at a middle zoom position, and at a telephoto end. FIGS. 10A through 10C are aberration charts of the zoom lens according to the fifth exemplary embodiment at the wide-angle end, at the middle zoom position, and at the telephoto end. The fifth exemplary embodiment is a zoom lens having a zoom ratio of 10.01, an aperture ratio (F-number) ranging from 1.85 to 3.00, and an imaging angle of view ranging from 78.48° to 10.96°.

Figure 11A:
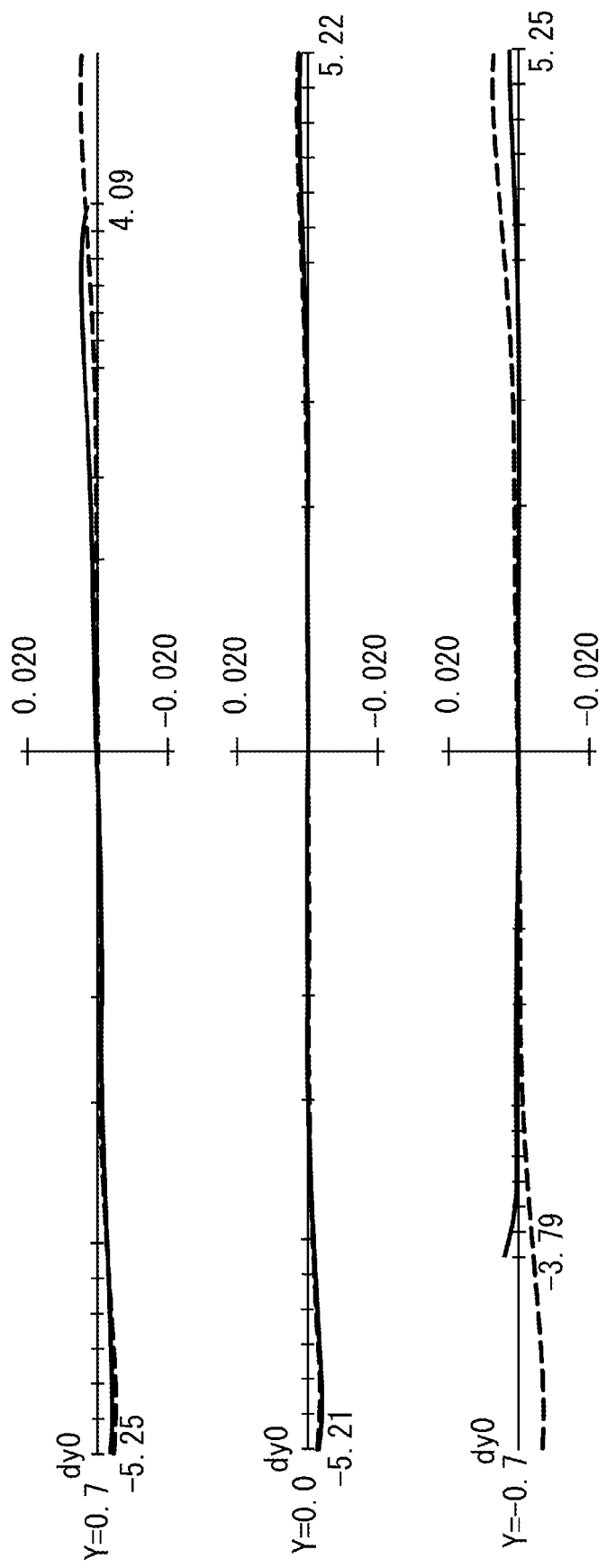
FIGS. 11A, 11B, and 11C are lateral aberration charts illustrating aberrations that may occur when an image stabilizing operation is executed according to the first exemplary embodiment of the present invention.
Figure 11B:
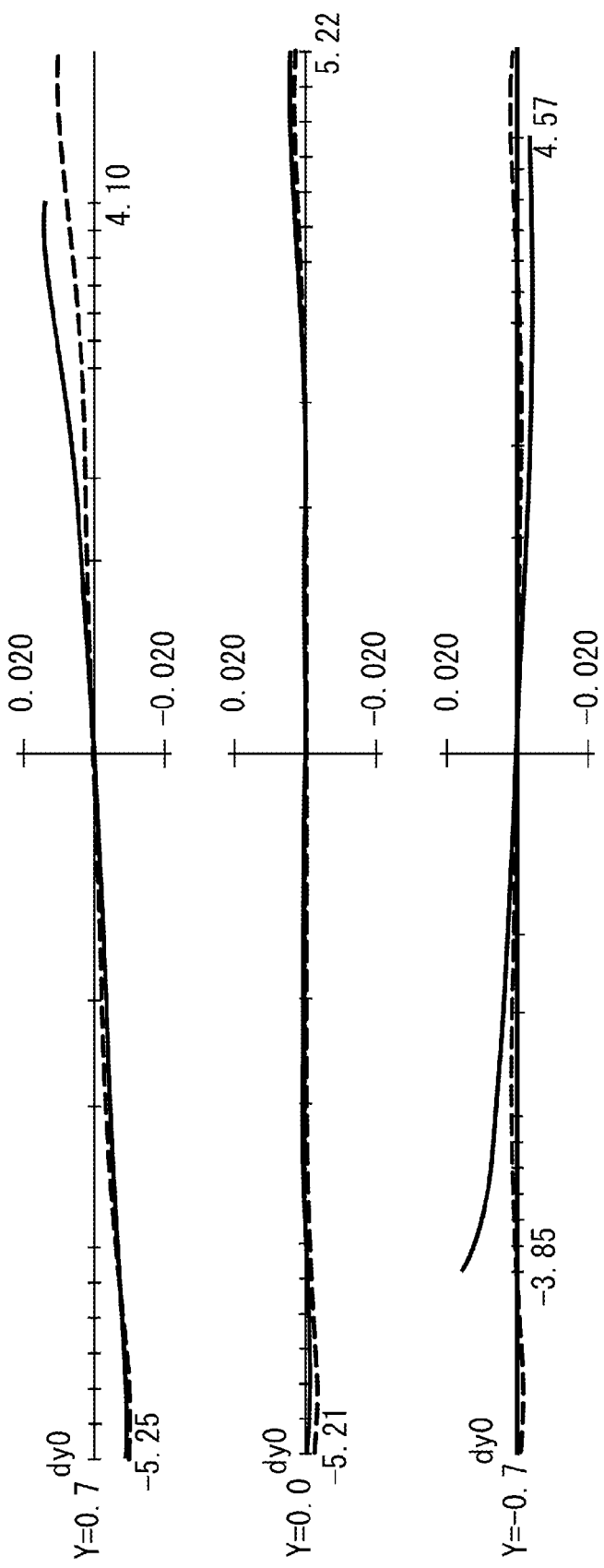
Figure 11C:
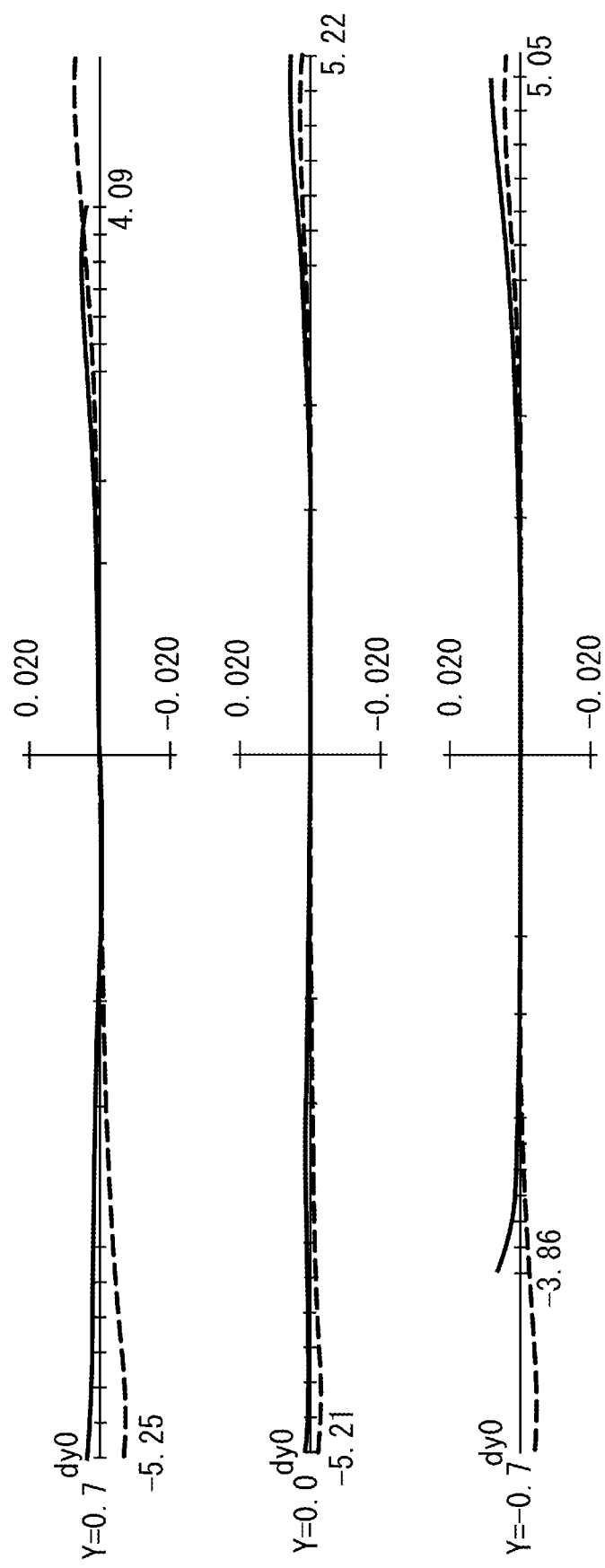
Figure 12:
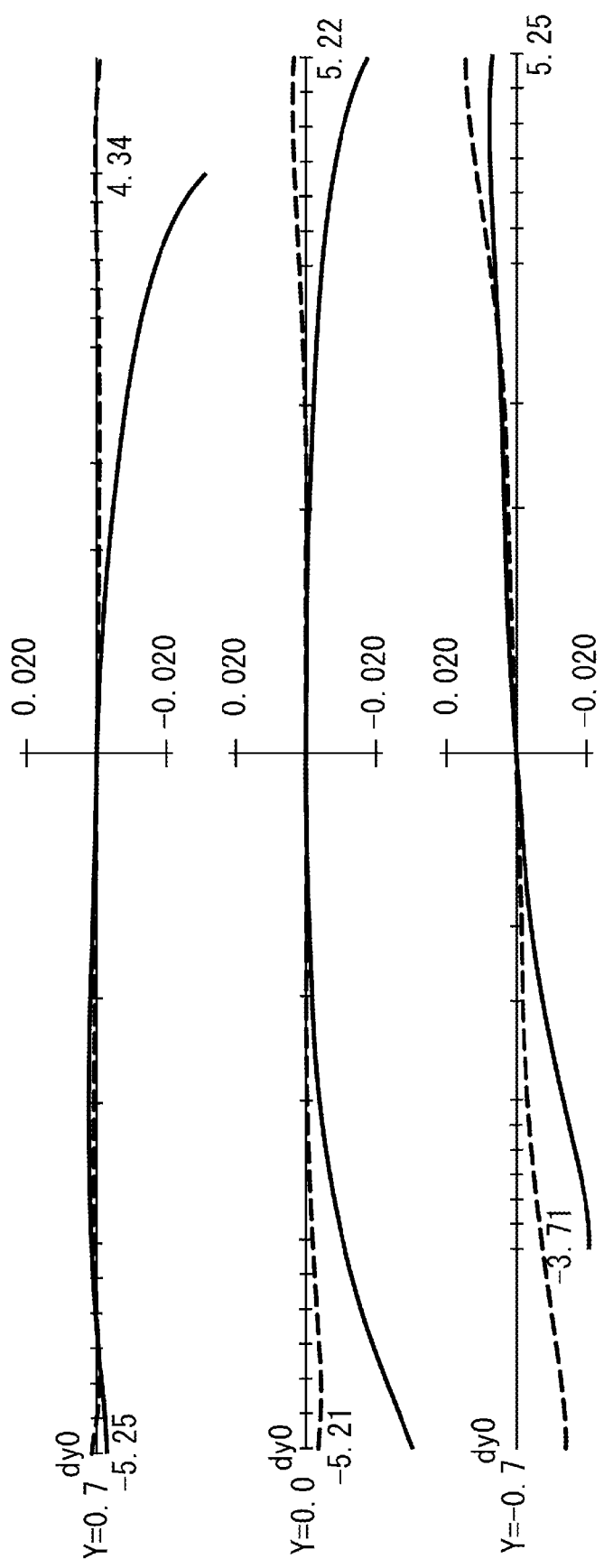
FIG. 12 is a lateral aberration chart illustrating aberrations that may occur when an image stabilizing operation is executed according to the first exemplary embodiment of the present invention.
Figure 13:
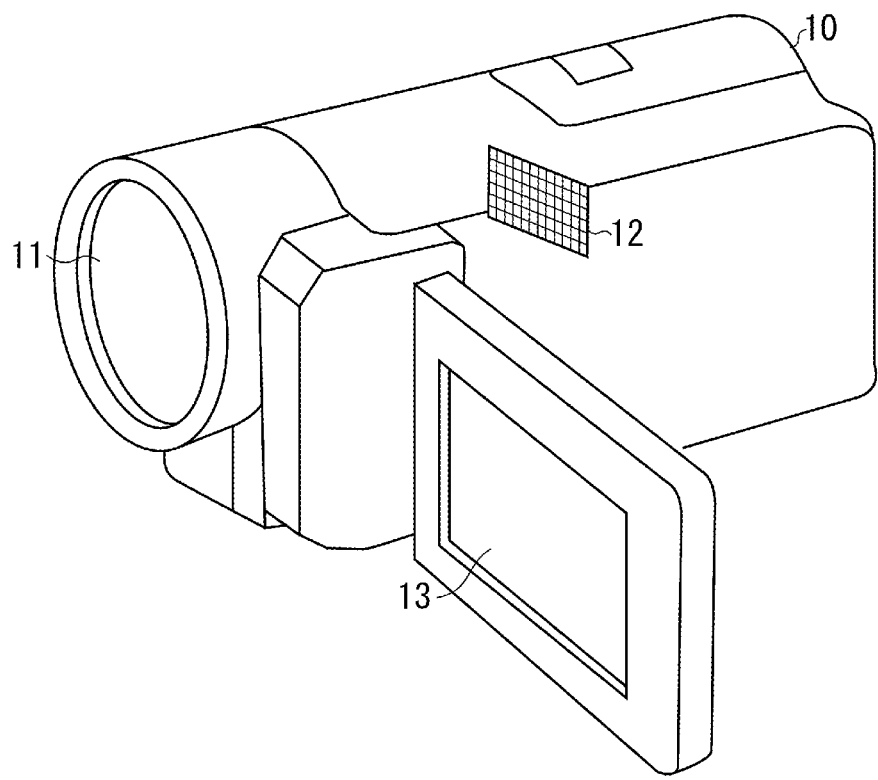
FIG. 13 illustrates main components of an image pickup apparatus according to an exemplary embodiment of the present invention.

FIGS. 11A through 11C are lateral aberration charts illustrating aberrations that may occur when an image stabilizing operation is executed by using the third lens unit, the fourth lens unit, and the fifth lens unit, respectively, according to the first exemplary embodiment of the present invention. FIG. 12 is a lateral aberration chart illustrating aberrations that may occur when an image stabilizing operation is executed by integrally operating the second and the third lenses of the third lens unit according to the first exemplary embodiment of the present invention. FIG. 13 illustrates main components of an image pickup apparatus according to an exemplary embodiment of the present invention.

The zoom lens according to an exemplary embodiment of the present invention is used in an image pickup apparatus, such as a digital camera, a video camera, and a silver-halide film camera, a viewing apparatus, such as binoculars, and an optical apparatus, such as a copying machine or a projector.

In each of the diagrams illustrating a cross sectional view of the zoom lens (FIGS. 1A through 1C, 3A through 3C, 5A through 5C, 7A through 7C, and 9A through 9C), a front side (an object side, an enlargement side) is illustrated at the left-hand portion of the drawing, and a rear side (an image side, a reduction side) is illustrated at the right-hand portion thereof. Furthermore, in each of the diagrams illustrating a cross sectional view of the zoom lens (FIGS. 1A through 1C, 3A through 3C, 5A through 5C, 7A through 7C, and 9A through 9C), "i" denotes an order of a lens unit as viewed from the object side towards the image side. "Bi" denotes an i-th lens unit.

The zoom lens according to each exemplary embodiment will be described in detail below. In each of the diagrams illustrating a cross sectional view of the zoom lens according to each exemplary embodiment (FIGS. 1A through 1C, 3A through 3C, 5A through 5C, 7A through 7C, and 9A through 9C), "B1" denotes a first lens unit having a positive refractive power (optical power=the inverse of the focal length), "B2" denotes a second lens unit having a negative refractive power, "B3" denotes a third lens unit having a positive refractive power, "B4" denotes a fourth lens unit having a negative refractive power, and "B5" denotes a fifth lens unit having a positive refractive power.

Furthermore, "SP" denotes an F-number determination member (hereinafter simply referred to as an "aperture stop"), which is configured to function as an aperture stop that determines (restricts) a full-aperture F-number (Fno). The aperture stop SP is located between the second lens unit B2 and the third lens unit B3.

"G" denotes an optical block, such as an optical filter, a faceplate, a crystal low-pass filter, or an infrared cut filter. "IP" denotes an image plane. The image plane IP is, when the zoom lens according to an exemplary embodiment of the present invention is used as a photographic optical system of a video camera or a digital still camera, equivalent to an imaging plane of a solid-state image sensor (photoelectric conversion element), such as a charge-coupled device (CCD) sensor or a complementary metal-oxide semiconductor (CMOS) sensor. If the zoom lens according to an exemplary embodiment of the present invention is used as a photographic optical system of a silver-halide film camera, the image plane IP is a photosensitive surface equivalent to a film surface of the optical system of the silver-halide film camera.

In a portion of each aberration chart (FIGS. 2A through 2C, 4A through 4C, 6A through 6C, 8A through 8C, and 10A through 10D) illustrating spherical aberration, the solid line denotes the spherical aberration with respect to d-line light. The alternate long and two short dashes line denotes the spherical aberration with respect to g-line light.

In a portion of each aberration chart (FIGS. 2A through 2C, 4A through 4C, 6A through 6C, 8A through 8C, and 10A through 10D) illustrating astigmatism, the dotted line and the solid line denote a meridional image plane and a sagittal image plane, respectively. Chromatic aberration of magnification is represented with respect to g-line light. "Fno" denotes an F-number and "ω" denotes a half angle of view. In each of the diagrams illustrating a cross sectional view of the zoom lens (FIGS. 1A through 1C, 3A through 3C, 5A through 5C, 7A through 7C, and 9A through 9C), each lens unit moves along a moving locus indicated by an arrow during zooming from the wide-angle end to the telephoto end.

In each of the following exemplary embodiments, each of the wide-angle end and the telephoto end refers to a zooming position when a magnification varying lens unit is positioned at each of the ends of a range in which the magnification varying lens unit can mechanically move along the optical axis.

In each exemplary embodiment, the second lens unit B2 is moved towards the image side as indicated by the arrow during zooming from the wide-angle end to the telephoto end. In addition, the third lens unit B3 and the fourth lens unit B4 are moved along a locus convex towards the object side. In the first through the fourth exemplary embodiments, the fifth lens unit B5 is stationary during zooming. On the other hand, in the fifth exemplary embodiment, the fifth lens unit B5 is moved towards the object side during zooming.

In addition, the aperture stop SP moves along a locus convex towards the object side separately and independently from the other lens units. The zoom lens according to each exemplary embodiment is a rear focus type zoom lens, which executes focusing by moving the fourth lens unit B4 along the optical axis.

A solid curve 4a and a dotted curve 4b for the fourth lens unit B4 denote moving loci of the fourth lens unit B4 to correct the variation of an image plane caused by the variation of magnification during focusing on an infinitely-distant object and a closest-distance object, respectively. By moving the fourth lens unit B4 along a locus convex towards the object side, the zoom lens according to each exemplary embodiment can effectively utilize the space between the third lens unit B3 and the fourth lens unit B4 and effectively reduce the lens total length (the distance from the first lens surface to the image plane).

Focusing from an infinitely-distant object to a closest-distance object at the telephoto end is executed by moving the fourth lens unit B4 backwards (towards the image side) as indicated with an arrow 4c. The first lens unit B1 is stationary in the direction of the optical axis during zooming. However, the first lens unit B1 can be moved to correct aberration where necessary.

Furthermore, the entire third lens unit B3 or a part of the third lens unit B3, the fourth lens unit B4, or the fifth lens unit B5 can be moved in such a direction as to have a component vertical to the optical axis to move an image forming position in a direction vertical to the optical axis. To paraphrase this, the entire third lens unit B3 or a part of the third lens unit B3, the fourth lens unit B4, or the fifth lens unit B5 can be moved to implement image stabilization.

To achieve a wide angle of view and effectively correct various aberrations, the zoom lens according to each exemplary embodiment includes, in order from the object side to the image side, a lens unit having a positive refractive power, a lens unit having a negative refractive power, an aperture stop, a lens unit having a positive refractive power, a lens unit having a negative refractive power, and a lens unit having a positive refractive power. By alternately locating the lens unit having a positive refractive power and the lens unit having a negative refractive power in order from the object side to the image side, the beam-condensing function and the beam-diffusing function are serially executed in combination with each other. With the above-described configuration, the zoom lens according to each exemplary embodiment can easily correct various aberrations, which may occur when the angle of view is increased.

Furthermore, in the zoom lens according to each exemplary embodiment, the second lens unit B2 functions as a main magnification varying lens unit. In addition, the third lens unit B3 is provided with an appropriate power for variable magnification. With the above-described configuration, the zoom lens according to each exemplary embodiment can effectively correct various aberrations that may occur during zooming even with a bright (small) F-number. The fourth lens unit B4 functions to correct variations on the image plane that may occur during zooming.

When the lens configuration in which the first lens unit B1 is fixed (stationary) during zooming, the height of incidence of an off-axis ray that goes through the first lens unit B1 becomes the highest in a middle range of the zooming (at a middle zoom position). Accordingly, the effective diameter of the first lens unit B1 may become large. As a result, it becomes difficult to reduce the total size of the zoom lens.

To address this issue, in each exemplary embodiment, the aperture stop SP is moved along a locus convex towards the object side separately and independently from the lens units to arbitrarily move the entrance pupil. In addition, the aperture stop SP is moved towards the object side in the zoom middle range to lower the height of incidence of the off-axis ray that goes through the first lens unit B1 in the zoom middle range. As a result, each exemplary embodiment can reduce the effective diameter of the first lens unit B1 to a small dimension. In addition, by moving the aperture stop SP, each exemplary embodiment can secure an appropriate amount of light around the image plane for the entire zoom area.

The fourth lens unit B4 moves along a locus convex towards the object side to be located closest to the object side at the zooming position at which the aperture stop SP is located closest to the object side. Accordingly, the entrance pupil becomes closer to the object side. As a result, each exemplary embodiment can effectively reduce the effective diameter of the first lens unit B1.

In order to implement an effect of each of the following conditions, each exemplary embodiment satisfies one or more of the following conditions.

When DS3 is an interval between the aperture stop SP and the third lens unit B3 at a zooming position at which the aperture stop SP is located closest to the object side, f2 is a focal length of the second lens unit B2, f3 is a focal length of the third lens unit B3, fw is a focal length of the entire zoom lens at the wide-angle end, ft is a focal length of the entire zoom lens at the telephoto end, $\beta 2W$ is a lateral magnification of the second lens unit B2 at the wide-angle end, $\beta 2T$ is a lateral magnification of the second lens unit B2 at the telephoto end, $\beta 3W$ is a lateral magnification of the third lens unit B3 at the wide-angle end, $\beta 3T$ is a lateral magnification of the third lens unit B3 at the telephoto end, and $vd4$ is a dispersion value of a material of one negative lens included in the fourth lens unit B4, one or more of the following conditions can be satisfied:

$$0.5 < DS3/f3 < 2.0 \quad (1)$$

$$-2.50 < f3/f2 < -1.50 \quad (2)$$

$$-1.00 < f2/\sqrt{(fw \times ft)} < -0.50 \quad (3)$$

$$0.3 < (\beta 2T/\beta 2W)/(\beta 3T/\beta 3W) < 3.0 \quad (4)$$

$$1.5 < \beta 3T/\beta 3W < 4.5 \quad (5)$$

$$50 < vd4 < 90 \quad (6).$$

The technical significance of each condition will be described in detail below. The condition (1) provides a condition for an appropriate amount of moving the aperture stop SP during zooming and an appropriate refractive power to be assigned to the third lens unit B3. If the upper limit value of the condition (1) is exceeded, then the aperture stop SP becomes closer to the object side. Accordingly, the effective diameter of the front lens can be reduced.

However, in this case, the effective diameter of the axial ray that enters the third lens unit B3 may increase. Accordingly, the height of incidence of the off-axis ray becomes higher. As a result, it becomes necessary to increase the refractive power of the third lens unit B3. If the refractive power of the third lens unit B3 is increased, spherical aberration and curvature of field may increase. Accordingly, it becomes difficult to correct spherical aberration and curvature of field.

On the other hand, if the lower limit value of the condition (1) is exceeded, although it becomes easier to correct various aberrations, it becomes difficult to reduce the total size of the zoom lens because the aperture stop SP is moved.

The condition (2) provides a condition for an appropriate range of values of the refractive powers to be assigned to the second lens unit B2 and the third lens unit B3. If the focal length of the second lens unit B2, which is the main magnification varying lens unit, is reduced, it becomes easier to reduce the total size of the zoom lens because a high variable magnification function can be implemented with a less moving amount of the second lens unit B2 during zooming. However, in this case, it becomes difficult to correct aberrations for the entire zoom range. Accordingly, it is necessary to assign an appropriate power for variable magnification sharedly with the third lens unit B3.

If the lower limit value of the condition (2) is exceeded, it becomes easier to increase the effect of variable magnification because the refractive power of the second lens unit B2 is increased. However, in this case, it becomes difficult to correct various aberrations. In particular, curvature of field may increase at the wide-angle end.

On the other hand, if the upper limit value of the condition (2) is exceeded, it becomes easier to correct aberrations. However, it becomes necessary to increase the moving amount of the second lens unit B2 during zooming to achieve a desired zoom ratio. As a result, the total size of the zoom lens may increase.

The condition (3) provides a condition for a power assigned to the second lens unit B2 for variable magnification during zooming and for an effect of correcting aberrations. If the lower limit value of the condition (3) is exceeded, then the variation on the image plane and the variation of chromatic aberration of magnification may increase for the entire zoom range. Accordingly, it becomes difficult to maintain a high optical performance.

On the other hand, if the upper limit value of the condition (3) is exceeded, then the moving amount of the second lens unit B2 during zooming may increase. As a result, it becomes difficult to reduce the total size of the zoom lens.

The condition (4) provides a condition for a power assigned to the second lens unit B2 and the third lens unit B3 for variable magnification.

If the upper limit value of the condition (4) is exceeded, the burden on the second lens unit B2 for variable magnification increases. Accordingly, the difference between the angles of incidence when the entire light fluxes peripheral to the image plane are incident to a refraction surface of the second lens unit B2 at the wide-angle end and at the telephoto end may become extremely large. As a result, the variation of curvature of field that may occur during zooming may become large. Accordingly, it becomes difficult to appropriately correct curvature of field for the entire zoom range.

If the lower limit value of the condition (4) is exceeded, the burden on the third lens unit B3 for variable magnification may increase. Accordingly, it becomes necessary to increase the refractive power assigned to the third lens unit B3. Therefore, the radius of curvature of each lens surface within the third lens unit B3 may become small. Accordingly, it becomes difficult to correct coma for the entire zoom range.

The condition (5) provides a condition for the lateral magnification of the third lens unit B3 at the telephoto end in relation to the lateral magnification of the third lens unit B3 at the wide-angle end. If the upper limit value of the condition (5) is exceeded, the effect of variable magnification of the third lens unit B3 may become extremely high. As a result, it becomes difficult to correct spherical aberration and coma.

To increase the effect of variable magnification of the third lens unit B3, it is necessary to increase the refractive power assigned to the third lens unit B3. If the refractive power of the third lens unit B3 is increased, the sensitivity of the third lens unit B3 to aberrations at the telephoto end may increase. Therefore, in this case, the tolerance related to manufacturing error (decentralization of the lens or tilting of the lens) may become severe.

If the lower limit value of the condition (5) is exceeded, the effect of variable magnification by the third lens unit B3 may become low. As a result, it becomes difficult to reduce the total size of the zoom lens. If the effect of variable magnification of the third lens unit B3 becomes small, it becomes necessary to increase the effect of variable magnification of the second lens unit B2.

Accordingly, because it is necessary to increase the power (refractive power) of the second lens unit B2 or to increase the moving amount of the second lens unit B2 during zooming, it becomes difficult to reduce the total size of the zoom lens while maintaining a sufficiently high optical performance.

The condition (6) provides a condition for the dispersion of the material of the negative lens included in the fourth lens unit B4. If a material having a low dispersion exceeding the lower limit value of the condition (4) is used, the variation of chromatic aberration during zooming may become large. Accordingly, it becomes necessary that the fourth lens unit B4 is constituted by a plurality of lenses for achromatism. As a result, it becomes difficult to reduce the total size of the zoom lens.

On the other hand, if the upper limit value of the condition (6) is exceeded, it becomes necessary to reduce the curvature of the lens surface of the lens included in the fourth lens unit B4 to achieve a sufficiently high refractive power because the higher the dispersion of an existing material becomes, the lower the refractive power becomes. As a result, the volume of the entire zoom lens including edge portions may increase. Accordingly, in this case, it becomes difficult to reduce the total size of the zoom lens.

In order to more easily achieve the effect of each condition, it is further useful if the ranges of the value in the conditions (1) through (6) are altered as follows:

$$1.0 < DS3/f3 < 1.5 \quad (1a)$$

$$-1.95 < f3/f2 < -1.60 \quad (2a)$$

$$-0.80 < f2/\sqrt{(fw \times ft)} < -0.55 \quad (3a)$$

$$0.5 < (\beta 2T/\beta 2W)/(\beta 3T/\beta 3W) < 2.7 \quad (4a)$$

$$2.0 < \beta 3T/\beta 3W < 4.2 \quad (5a)$$

$$60 < vd4 < 85 \quad (6a).$$

In order to yet more easily achieve the effect of each condition, it is further useful if the ranges of the value in the conditions (1a) through (6a) are altered as follows:

$$1.1 < DS3/f3 < 1.2 \quad (1b)$$

$$-1.92 < f3/f2 < -1.70 \quad (2b)$$

$$-0.78 < f2/\sqrt{(fw \times ft)} < -0.59 \quad (3b)$$

$$0.6 < (\beta 2T/\beta 2W)/(\beta 3T/\beta 3W) < 2.4 \quad (4b)$$

$$2.5 < \beta 3T/\beta 3W < 4.0 \quad (5b)$$

$$65 < vd4 < 82 \quad (6b).$$

As described above, each exemplary embodiment can achieve a wide angle of view while maintaining a bright F-number. In addition, each exemplary embodiment can easily reduce the effective diameter of the front lens by using the first lens unit that is stationary during zooming. Furthermore, each exemplary embodiment can achieve a zoom lens having a high optical performance for the entire zoom range from the wide-angle end to the telephoto end.

Now, characteristics of each exemplary embodiment will be described in detail below.

In the zoom lens according to each exemplary embodiment, the refractive power of the second lens unit B2 is sufficiently increased while the power for variable magnification are appropriately shared with the third lens unit B3. With this configuration, the zoom lens according to each exemplary embodiment can achieve a high zoom ratio and a wide angle of view at the same time.

In addition, in the zoom lens according to each exemplary embodiment, the aperture stop SP is moved towards the object side in the middle zoom range. Accordingly, in the zoom lens according to each exemplary embodiment, the effective diameter of the front lens can be easily reduced while the first lens unit B1 is stationary during zooming.

At the same time, the fourth lens unit B4 is moved to a position closest to the object side at the zooming position at which the aperture stop SP is located closest to the object side. Accordingly, the entrance pupil position is moved closer to the object side as well as the aperture stop SP. Accordingly, the zoom lens according to each exemplary embodiment can easily reduce the effective diameter of the front lens. In addition, when focusing is executed by the fourth lens unit B4, the zoom lens according to each exemplary embodiment can execute the focusing operation with a smaller moving amount of the fourth lens unit B4.

Furthermore, in the first through the fourth exemplary embodiments, the fifth lens unit B5 is stationary during zooming. Accordingly, the zoom lens according to the first through the fourth exemplary embodiments reduces the number of movable lens units. Accordingly, the zoom lens according to the first through the fourth exemplary embodiments can achieve a zoom lens having a wide angle of view and a high zoom ratio.

If the fifth lens unit B5 is stationary during zooming, the mechanism of zooming can be simplified. Accordingly, it becomes easier to reduce the total size of the lens barrel mechanism.

In the fifth exemplary embodiment, the fifth lens unit B5 is moved during zooming. Accordingly, the zoom lens according to the fifth exemplary embodiment can suppress variation of aberrations that may occur during zooming.

In addition, the fourth lens unit B4 can be constituted by one lens or two lenses to execute focusing. By restricting the number of lenses included in the fourth lens unit B4 to two or less, it becomes easy to constitute a light focusing lens mechanism. As a result, the focusing operation can be quickly executed. In addition, it becomes easy to reduce the total size of the zoom lens including mechanical components. In order to effectively correct aberrations, one or more aspheric surfaces are provided to the fourth lens unit B4.

If one or more aspheric surfaces are provided to the fifth lens unit B5, it becomes easy to correct curvature of field. If the fifth lens unit B5 is constituted by three lenses including a positive lens, a negative lens, and a positive lens, it becomes easy to correct the curvature of field.

Recently, according to current market preferences, it is desired that a zoom lens used in an image pickup apparatus include an anti-shake correction mechanism for correcting an image shake that may occur when the entire optical system is shaken (tilted). In addition, it is desired for the zoom lens like this to maintain a high optical performance during an operation for correcting an image shake.

In the zoom lens according to each exemplary embodiment, any lens unit located closer to the image side than the aperture stop SP or a part of lenses included in the lens unit is moved in a direction vertical or substantially vertical to the optical axis. Accordingly, the zoom lens according to each exemplary embodiment can correct an image shake while maintaining a high optical performance.

Because the lens unit located closer to the image side than the aperture stop SP has a small effective diameter, it is relatively easy to provide a mechanism for moving the lens unit in a direction vertical or substantially vertical to the optical axis. Accordingly, with the above-described configuration, the size of a drive source can be reduced. As a result, the total size of the lens barrel can be reduced.

FIGS. 11A through 11C are lateral aberration charts for the zoom lens according to the first exemplary embodiment, which illustrate aberrations that may occur when an image stabilizing operation is executed by moving each lens unit located rear to the aperture stop SP in a direction vertical to the optical axis to correct an image shake of a photographed image that may occur when the entire optical system is shaken (tilted).

More specifically, FIG. 11A is a lateral aberration chart illustrating aberration in relation to d-line light at the telephoto end when the third lens unit B3 is moved to correct an image shake that occurs when the zoom lens is tilted by 0.3°. FIG. 11B is a lateral aberration chart illustrating aberration in relation to d-line light at the telephoto end when the fourth lens unit B4 is moved to correct an image shake that occurs when the zoom lens is tilted by 0.3°. FIG. 11C is a lateral aberration chart illustrating an aberration in relation to d-line light at the telephoto end when the fifth lens unit B5 is moved to correct an image shake that occurs when the zoom lens is tilted by 0.3°.

In each of the aberration charts illustrated in FIGS. 11A through 11C, the chart illustrated in the middle of each of FIGS. 11A through 11C illustrates an aberration occurring on the optical axis. The upper chart illustrates an aberration occurring at the upper 70% of the image height against the highest image height (100%). The lower chart illustrates an aberration occurring at the lower 70% of the image height against the highest image height (100%).

Similarly, FIG. 12 is a lateral aberration chart when an image stabilizing operation is executed by moving only a second lens and a third lens only, which are a part of the third lens unit B3, in a direction vertical to the optical axis to correct an image shake of a photographed image that may occur when the entire optical system is shaken (tilted).

The third lens unit B3 can include one or more aspheric surfaces to correct an image shake by moving a part of or the entire third lens unit B3 in such a direction as to have a component vertical or substantially vertical to the optical axis. By executing the image stabilization by using the third lens unit B3, which is located close to the aperture stop SP, it becomes easy to suppress decentering coma, which may occur when an image shake is corrected.

In addition, if the aperture stop SP is moved towards the object side at a middle zoom position to reduce the effective diameter of the front lens, the height of incidence of the off-axis ray in the fifth lens unit B5 becomes the highest at the middle zoom position. As a result, it becomes particularly difficult to correct curvature of field. Accordingly, in each exemplary embodiment, the fifth lens unit B5 can be constituted by three lenses including positive and negative lenses. With the above-described configuration, it becomes easy to correct aberrations.

An image pickup apparatus according to an exemplary embodiment of the present invention includes the zoom lens according to any one of the above-described exemplary embodiments of the present invention and a circuit configured to electrically correct at least one of distortion or chromatic aberration of magnification. With the above-described configuration that can tolerate distortion that may occur in the zoom lens, it becomes easier to reduce the number of lenses included in the zoom lens and to reduce the total size of the zoom lens.

In addition, by electrically correcting chromatic aberration of magnification, the image pickup apparatus according to each exemplary embodiment can reduce the blurring of color in a photographed image. Furthermore, the image pickup apparatus according to each exemplary embodiment having the configuration described above can easily increase the resolution of a photographed image.

Now, an exemplary embodiment of a digital video camera that uses the zoom lens according to each exemplary embodiment of the present invention as a photographic optical system will be described below with reference to FIG. 13.

Referring to FIG. 13, the digital video camera includes a camera body 10 and a photographic optical system 11, which is constituted by the zoom lens according to any of the above-described exemplary embodiments of the present invention. The camera body 10 includes an image sensor (photoelectric conversion element) 12, such as a CCD sensor or a CMOS sensor. The image sensor 12 receives an object image formed by the photographic optical system 11. A photographer can observe an object image displayed by a liquid crystal display (LCD) panel 13.

By applying the zoom lens according to each exemplary embodiment of the present invention to an image pickup apparatus, such as a digital still camera, the present invention can implement a small-size image pickup apparatus having a high optical performance.

Numerical examples 1 through 5, which respectively correspond to the first through the fifth exemplary embodiments of the present invention, are set forth below. In each of the numerical examples 1 through 5, "i" denotes the order of a surface from the object side, "ri" denotes a radius of curvature of an i-th optical surface (i-th lens surface) from the object side, "di" denotes a lens thickness and an axial space of the i-th lens from the object side, "ndi" and "vdi" respectively denote a refractive index and an Abbe number of the material of the i-th optical member from the object side with respect to d-line light. The last four surfaces are glass blocks.

In addition, and each of "A4", "A6", "A8", "A10", and "A12" denotes an aspheric coefficient for each corresponding order. The aspheric shape is expressed as $$X=(H^2/R)/[1+\{1-(1+K)\times(H/R)^2\}^{1/2}]+A4\times H^4+A6\times H^6+A8\times H^8+A10\times H^{10}+A12\times H^{12}$$

where the aspheric shape has a positive value in the direction of travel of light, "X" (i.e., the X-axis) denotes a displacement from a surface vertex along the optical axis in a position at a height "H" from the optical axis (i.e., an H-axis), "R" denotes a paraxial radius of curvature, and "K" denotes a conic constant. Furthermore, the scientific notation "e+X" for each aspheric coefficient is equivalent to the exponential notation "$1\times10^{+X}$". In addition, the scientific notation "e−X" for each aspheric coefficient is equivalent to the exponential notation "$1\times10^{-X}$".

Furthermore, "BF" denotes a back focus, which is an air-equivalent distance (back focus) from a lens last surface to a paraxial image plane. The lens total length is constituted by adding the distance from a lens first surface to the lens last surface to the back focus BF. Aspherical surfaces are marked with an asterisk (*) on the side of the surface number. Each of the aperture stop SP and a glass block G is illustrated as one lens unit. Accordingly, each exemplary embodiment includes seven optical units. The relationship between each condition described above and each numerical example is set forth in Table 1.

Numerical Example 1

| Unit: mm | | | | |
|---|---|---|---|---|
| Surface Data | | | | |
| Surface No. | r | d | nd | vd |
| 1 | 79.758 | 1.50 | 1.84666 | 23.9 |
| 2 | 34.961 | 6.49 | 1.60311 | 60.6 |
| 3 | 521.626 | 0.20 | | |
| 4 | 37.597 | 2.89 | 1.78590 | 44.2 |
| 5 | 122.714 | Variable | | |
| 6 | −1207.244 | 0.90 | 1.80400 | 46.6 |
| 7 | 8.479 | 2.82 | | |
| 8 | 55.316 | 0.80 | 1.74330 | 49.3 |
| 9* | 27.826 | 1.08 | | |
| 10 | −33.365 | 0.80 | 1.78590 | 44.2 |
| 11 | 18.979 | 0.30 | | |
| 12 | 16.922 | 2.00 | 1.92286 | 18.9 |

-continued

Unit: mm

| | | | | |
|---|---|---|---|---|
| 13 | 194.905 | Variable | | |
| 14 (Stop) | ∞ | Variable | | |
| 15* | 13.179 | 3.50 | 1.58313 | 59.4 |
| 16* | −54.730 | 5.09 | | |
| 17 | 16.545 | 0.50 | 1.92286 | 18.9 |
| 18 | 9.184 | 1.78 | | |
| 19 | 12.635 | 2.44 | 1.69680 | 55.5 |
| 20 | −24.112 | Variable | | |
| 21* | −33.013 | 0.50 | 1.55332 | 71.7 |
| 22* | 8.603 | Variable | | |
| 23 | 17.584 | 1.26 | 1.59282 | 68.6 |
| 24 | 128.726 | 0.30 | | |
| 25 | 15.779 | 0.50 | 1.92286 | 18.9 |
| 26 | 10.034 | 2.95 | 1.71300 | 53.9 |
| 27 | −43.610 | 2.5 | | |
| 28 | ∞ | 1.86 | 1.51633 | 64.1 |
| 29 | ∞ | 1.15 | | |
| 30 | ∞ | 0.50 | 1.49000 | 70.0 |
| 31 | ∞ | 0.41 | | |
| Image plane | ∞ | | | |

Aspheric Coefficients

| | |
|---|---|
| R9 | K = −4.19600e+000    A4 = −3.07099e−005 |
| | A6 = −1.64983e−007   A8 = −1.60130e−010 |
| | A10 = −1.43564e−010  A12 = −8.16851e−013 |
| R15 | K = −2.78370e+000    A4 = 1.53070e−004 |
| | A6 = −5.58131e−007   A8 = 2.17830e−008 |
| | A10 = 1.04301e−010   A12 = −8.89442e−012 |
| R16 | K = 3.65082e+000     A4 = 1.23693e−004 |
| | A6 = 1.41102e−007    A8 = 9.29048e−009 |
| | A10 = −6.61251e−011  A12 = −2.44948e−012 |
| R21 | K = −8.53440e+001    A4 = −4.18488e−005 |
| | A6 = 2.38040e−006    A8 = −2.37763e−007 |
| | A10 = −2.80011e−009  A12 = 5.18450e−010 |
| R22 | K = −9.95357e−001    A4 = 4.23761e−004 |
| | A6 = −6.51217e−006   A8 = −1.54756e−007 |
| | A10 = 8.71311e−009   A12 = 3.65323e−010 |

Various Data
Zoom Ratio 10.00

| | Wide-Angle End | Middle Focal Length | Telephoto End |
|---|---|---|---|
| Focal Lengths | 3.13 | 4.74 | 31.29 |
| F-number | 1.85 | 2.14 | 3.00 |
| Half Angle of View | 39.17 | 32.35 | 5.48 |
| Image Height | 2.55 | 3.00 | 3.00 |
| Lens Total Length | 92.02 | 92.02 | 92.02 |
| BF | 5.62 | 5.62 | 5.62 |
| d5 | 0.76 | 5.35 | 28.69 |
| d13 | 32.17 | 16.65 | 1.24 |
| d14 | 9.79 | 16.12 | 1.81 |
| d20 | 1.92 | 2.37 | 13.32 |
| d22 | 3.17 | 7.33 | 2.75 |

Data of Each Lens Unit

| Lens Unit | First Surface | Focal Length |
|---|---|---|
| 1 | 1 | 58.94 |
| 2 | 6 | −7.58 |
| 3 | 14 | ∞ |
| 4 | 15 | 13.83 |
| 5 | 21 | −12.28 |
| 6 | 23 | 12.58 |
| 7 | 28 | ∞ |

Numerical Example 2

Unit: mm

Surface Data

| Surface No. | r | d | nd | νd |
|---|---|---|---|---|
| 1 | 99.548 | 1.50 | 1.84666 | 23.9 |
| 2 | 36.432 | 6.10 | 1.48749 | 70.2 |
| 3 | −175.366 | 0.20 | | |
| 4 | 36.404 | 2.57 | 1.80610 | 40.9 |
| 5 | 185.348 | Variable | | |
| 6 | −233.002 | 0.80 | 1.78590 | 44.2 |
| 7 | 8.863 | 2.54 | | |
| 8 | 876.540 | 0.80 | 1.67790 | 54.9 |
| 9 | 31.032 | 0.99 | | |
| 10 | −33.656 | 0.80 | 1.91082 | 35.3 |
| 11 | 25.020 | 0.65 | | |
| 12 | 20.244 | 2.50 | 1.92286 | 18.9 |
| 13 | −108.693 | Variable | | |
| 14 (Stop) | ∞ | Variable | | |
| 15* | 14.040 | 3.50 | 1.58313 | 59.4 |
| 16* | −64.118 | 4.82 | | |
| 17 | 15.630 | 0.50 | 1.84666 | 23.9 |
| 18 | 8.769 | 1.56 | | |
| 19 | 11.040 | 3.29 | 1.49700 | 81.5 |
| 20 | −18.870 | Variable | | |
| 21* | −35.707 | 0.50 | 1.55332 | 71.7 |
| 22* | 11.422 | Variable | | |
| 23 | 15.656 | 1.26 | 1.80610 | 40.9 |
| 24 | 34.374 | 0.30 | | |
| 25 | 16.445 | 0.50 | 1.92286 | 18.9 |
| 26 | 9.283 | 3.16 | 1.77250 | 49.6 |
| 27 | −86.220 | 2.5 | | |
| 28 | ∞ | 1.86 | 1.51633 | 64.1 |
| 29 | ∞ | 1.15 | | |
| 30 | ∞ | 0.50 | 1.49000 | 70.0 |
| 31 | ∞ | | | |
| Image plane | ∞ | | | |

Aspheric Coefficients

| | |
|---|---|
| R15 | K = −2.52489e+000    A4 = 1.11050e−004 |
| | A6 = −5.85518e−007   A8 = −3.48407e−010 |
| | A10 = 5.83176e−010   A12 = −1.76288e−011 |
| R16 | K = 1.94866e+001     A4 = 9.53994e−005 |
| | A6 = −4.42774e−007   A8 = 2.45623e−009 |
| | A10 = 3.74441e−010   A12 = −1.80682e−011 |
| R21 | K = −1.07625e+002    A4 = −3.48120e−005 |
| | A6 = 2.53015e−006    A8 = −1.62544e−007 |
| | A10 = 1.45384e−009   A12 = 7.34982e−011 |
| R22 | K = −9.76155e−001    A4 = 3.43648e−004 |
| | A6 = −6.88164e−006   A8 = −1.76249e−007 |
| | A10 = 2.26820e−008   A12 = −5.29724e−010 |

Various Data
Zoom Ratio 15.00

| | Wide-Angle End | Middle Focal Length | Telephoto End |
|---|---|---|---|
| Focal Length | 3.52 | 5.41 | 52.81 |
| F-number | 1.85 | 2.15 | 3.00 |
| Half Angle of View | 35.91 | 29.00 | 3.25 |
| Image Height | 2.55 | 3.00 | 3.00 |
| Lens Total Length | 96.57 | 96.57 | 96.57 |
| BF | 5.70 | 5.70 | 5.70 |
| d5 | 0.85 | 5.75 | 34.22 |
| d13 | 33.44 | 15.78 | 0.85 |
| d14 | 9.67 | 17.67 | 2.90 |

-continued

Unit: mm

| | | | |
|---|---|---|---|
| d20 | 2.39 | 3.01 | 10.45 |
| d22 | 5.69 | 9.82 | 3.62 |

Data of Each Lens Unit

| Lens Unit | First Surface | Focal Length |
|---|---|---|
| 1 | 1 | 51.56 |
| 2 | 6 | -8.18 |
| 3 | 14 | ∞ |
| 4 | 15 | 15.59 |
| 5 | 21 | -15.58 |
| 6 | 23 | 13.39 |
| 7 | 28 | ∞ |

Numerical Example 3

Unit: mm

Surface Data

| Surface No. | r | d | nd | vd |
|---|---|---|---|---|
| 1 | 78.555 | 1.30 | 1.84666 | 23.9 |
| 2 | 33.127 | 3.97 | 1.60311 | 60.6 |
| 3 | 864.626 | 0.20 | | |
| 4 | 35.921 | 2.19 | 1.78590 | 44.2 |
| 5 | 147.818 | Variable | | |
| 6 | -295.531 | 0.90 | 1.80400 | 46.6 |
| 7 | 8.820 | 2.48 | | |
| 8 | 9050.814 | 0.80 | 1.74330 | 49.3 |
| 9* | 33.540 | 0.96 | | |
| 10 | -32.800 | 0.80 | 1.78590 | 44.2 |
| 11 | 24.194 | 0.30 | | |
| 12 | 18.250 | 2.00 | 1.92286 | 18.9 |
| 13 | 1135.692 | Variable | | |
| 14 (Stop) | ∞ | Variable | | |
| 15* | 13.408 | 3.50 | 1.58313 | 59.4 |
| 16* | -48.950 | 5.17 | | |
| 17 | 17.111 | 0.50 | 1.92286 | 18.9 |
| 18 | 9.232 | 1.77 | | |
| 19 | 12.555 | 2.67 | 1.69680 | 55.5 |
| 20 | -24.731 | Variable | | |
| 21* | -32.230 | 0.50 | 1.55332 | 71.7 |
| 22* | 8.633 | Variable | | |
| 23 | 17.149 | 1.23 | 1.59282 | 68.6 |
| 24 | 50.620 | 0.30 | | |
| 25 | 14.876 | 0.50 | 1.92286 | 18.9 |
| 26 | 10.549 | 3.18 | 1.71300 | 53.9 |
| 27 | -42.941 | 2.5 | | |
| 28 | ∞ | 1.86 | 1.51633 | 64.1 |
| 29 | ∞ | 1.15 | | |
| 30 | ∞ | 0.50 | 1.49000 | 70.0 |
| 31 | ∞ | | | |
| Image plane | ∞ | | | |

Aspheric Coefficients

| R9 | K = 5.19745e+000 | A4 = -1.69877e-005 |
| | A6 = -1.56832e-007 | A8 = 4.40738e-009 |
| | A10 = 4.05901e-011 | A12 = -5.49959e-012 |
| R15 | K = -2.79055e+000 | A4 = 1.43738e-004 |
| | A6 = -5.73538e-007 | A8 = 1.73006e-008 |
| | A10 = 3.29884e-010 | A12 = -8.73823e-012 |
| R16 | K = 1.06630e+000 | A4 = 1.24317e-004 |
| | A6 = 2.37561e-009 | A8 = 1.32997e-008 |
| | A10 = 5.37854e-011 | A12 = -2.69072e-012 |
| R21 | K = -7.67703e+001 | A4 = -4.74362e-005 |
| | A6 = 2.42022e-006 | A8 = -2.36262e-007 |
| | A10 = -3.14022e-010 | A12 = 3.86101e-010 |

-continued

Unit: mm

| R22 | K = -1.32884e+000 | A4 = 4.51903e-004 |
| | A6 = -6.29530e-006 | A8 = 3.86323e-008 |
| | A10 = -7.11289e-009 | A12 = 6.56260e-010 |

Various Data
Zoom Ratio 10.00

| | Wide-Angle End | Middle Focal Length | Telephoto End |
|---|---|---|---|
| Focal Length | 3.61 | 5.76 | 36.10 |
| F-number | 1.85 | 2.15 | 3.00 |
| Half Angle of View | 35.24 | 27.51 | 4.75 |
| Image Height | 2.55 | 3.00 | 3.00 |
| Lens Total Length | 86.79 | 86.79 | 86.79 |
| BF | 5.64 | 5.64 | 5.64 |
| d5 | 0.80 | 5.53 | 28.44 |
| d13 | 32.55 | 13.66 | 2.03 |
| d14 | 6.59 | 15.64 | 1.43 |
| d20 | 2.07 | 2.73 | 11.25 |
| d22 | 3.90 | 8.37 | 2.78 |

Data of Each Lens Unit

| Lens Unit | First Surface | Focal Length |
|---|---|---|
| 1 | 1 | 51.98 |
| 2 | 6 | -7.85 |
| 3 | 14 | ∞ |
| 4 | 15 | 14.01 |
| 5 | 21 | -12.25 |
| 6 | 23 | 12.82 |
| 7 | 28 | ∞ |

Numerical Example 4

Unit: mm

Surface Data

| Surface No. | r | d | nd | vd |
|---|---|---|---|---|
| 1 | 77.536 | 1.35 | 1.84666 | 23.9 |
| 2 | 32.621 | 3.62 | 1.60311 | 60.6 |
| 3 | 1290.339 | 0.20 | | |
| 4 | 36.658 | 2.10 | 1.78590 | 44.2 |
| 5 | 177.068 | Variable | | |
| 6 | -143.303 | 0.80 | 1.80400 | 46.6 |
| 7 | 8.839 | 2.38 | | |
| 8 | 108.040 | 0.80 | 1.74330 | 49.3 |
| 9* | 37.608 | 0.88 | | |
| 10 | -32.093 | 0.80 | 1.78590 | 44.2 |
| 11 | 22.278 | 0.30 | | |
| 12 | 17.524 | 2.00 | 1.92286 | 18.9 |
| 13 | 544.904 | Variable | | |
| 14 (Stop) | ∞ | Variable | | |
| 15* | 13.451 | 3.50 | 1.58313 | 59.4 |
| 16* | -49.421 | 5.00 | | |
| 17 | 17.561 | 0.50 | 1.92286 | 18.9 |
| 18 | 9.267 | 1.70 | | |
| 19 | 12.461 | 3.05 | 1.69680 | 55.5 |
| 20 | -25.346 | Variable | | |
| 21* | -30.683 | 0.50 | 1.49710 | 81.6 |
| 22* | 8.064 | Variable | | |
| 23 | 12.939 | 1.96 | 1.59282 | 68.6 |
| 24 | 27.826 | 0.30 | | |
| 25 | 14.737 | 0.50 | 1.92286 | 18.9 |

-continued

Unit: mm

| | | | | |
|---|---|---|---|---|
| 26 | 10.816 | 3.34 | 1.71300 | 53.9 |
| 27 | −73.078 | 2.5 | | |
| 28 | ∞ | 1.80 | 1.51633 | 64.1 |
| 29 | ∞ | 1.15 | | |
| 30 | ∞ | 0.50 | 1.49000 | 70.0 |
| 31 | ∞ | | | |
| Image plane | ∞ | | | |

Aspheric Coefficients

| | | |
|---|---|---|
| R9 | K = 2.28601e+000 | A4 = −1.60347e−005 |
| | A6 = −4.64408e−007 | A8 = 1.79360e−009 |
| | A10 = 8.46414e−010 | A12 = −2.52085e−011 |
| R15 | K = −2.83472e+000 | A4 = 1.39577e−004 |
| | A6 = −6.52837e−007 | A8 = 1.35223e−008 |
| | A10 = 3.01510e−010 | A12 = −8.14831e−012 |
| R16 | K = 1.30301e+001 | A4 = 1.16253e−004 |
| | A6 = −3.89895e−008 | A8 = 7.16707e−009 |
| | A10 = 1.52131e−010 | A12 = −5.13919e−012 |
| R21 | K = −7.21756e+001 | A4 = −6.34113e−005 |
| | A6 = 2.65734e−006 | A8 = −1.74076e−007 |
| | A10 = 4.69901e−009 | A12 = −6.72136e−012 |
| R22 | K = −1.14288e+000 | A4 = 4.26732e−004 |
| | A6 = −7.34654e−006 | A8 = 1.38914e−007 |
| | A10 = 7.32179e−009 | A12 = −2.73456e−010 |

Various Data
Zoom Ratio 10.05

| | Wide-Angle End | Middle Focal Length | Telephoto End |
|---|---|---|---|
| Focal Length | 3.81 | 6.00 | 38.28 |
| F-number | 1.85 | 2.15 | 3.00 |
| Half Angle of View | 33.81 | 26.58 | 4.48 |
| Image Height | 2.55 | 3.00 | 3.00 |
| Lens Total Length | 87.75 | 87.75 | 87.75 |
| BF | 5.69 | 5.69 | 5.69 |
| d5 | 0.82 | 5.08 | 28.68 |
| d13 | 33.64 | 13.81 | 2.08 |
| d14 | 5.99 | 15.98 | 2.57 |
| d20 | 1.53 | 2.17 | 8.70 |
| d22 | 4.51 | 9.44 | 4.46 |

Data of Each Lens Unit

| Lens Unit | First Surface | Focal Length |
|---|---|---|
| 1 | 1 | 50.26 |
| 2 | 6 | −8.22 |
| 3 | 14 | ∞ |
| 4 | 15 | 14.12 |
| 5 | 21 | −12.79 |
| 6 | 23 | 13.47 |
| 7 | 28 | ∞ |

Numerical Example 5

Unit: mm

Surface Data

| Surface No. | r | d | nd | vd |
|---|---|---|---|---|
| 1 | 80.016 | 1.50 | 1.84666 | 23.9 |
| 2 | 34.961 | 6.24 | 1.60311 | 60.6 |
| 3 | 507.300 | 0.20 | | |
| 4 | 37.589 | 2.74 | 1.78590 | 44.2 |
| 5 | 122.368 | Variable | | |
| 6 | −1239.300 | 0.90 | 1.80400 | 46.6 |
| 7 | 8.462 | 2.82 | | |
| 8 | 55.043 | 0.80 | 1.74330 | 49.3 |
| 9* | 27.169 | 1.07 | | |
| 10 | −34.090 | 0.80 | 1.78590 | 44.2 |
| 11 | 19.129 | 0.30 | | |
| 12 | 17.181 | 2.00 | 1.92286 | 18.9 |
| 13 | 250.279 | Variable | | |
| 14 (Stop) | ∞ | Variable | | |
| 15* | 13.137 | 3.50 | 1.58313 | 59.4 |
| 16* | −54.509 | 4.99 | | |
| 17 | 16.547 | 0.50 | 1.92286 | 18.9 |
| 18 | 9.181 | 1.78 | | |
| 19 | 12.632 | 2.46 | 1.69680 | 55.5 |
| 20 | −24.098 | Variable | | |
| 21* | −33.872 | 0.50 | 1.55332 | 71.7 |
| 22* | 8.608 | Variable | | |
| 23 | 18.028 | 1.32 | 1.59282 | 68.6 |
| 24 | 140.663 | 0.30 | | |
| 25 | 15.817 | 0.50 | 1.92286 | 18.9 |
| 26 | 10.106 | 2.92 | 1.71300 | 53.9 |
| 27 | −44.976 | Variable | | |
| 28 | ∞ | 1.86 | 1.51633 | 64.1 |
| 29 | ∞ | 1.15 | | |
| 30 | ∞ | 0.50 | 1.49000 | 70.0 |
| 31 | ∞ | | | |
| Image plane | ∞ | | | |

Aspheric Coefficients

| | | |
|---|---|---|
| R9 | K = −4.11855e+000 | A4 = −3.47729e−005 |
| | A6 = −1.83132e−007 | A8 = −1.19784e−009 |
| | A10 = −1.23502e−010 | A12 = −7.91770e−013 |
| R15 | K = −2.78522e+000 | A4 = 1.52130e−004 |
| | A6 = −5.03131e−007 | A8 = 2.02356e−008 |
| | A10 = 1.38174e−010 | A12 = −8.87037e−012 |
| R16 | K = 3.35227e+000 | A4 = 1.22604e−004 |
| | A6 = 1.20989e−007 | A8 = 1.11080e−008 |
| | A10 = −7.63185e−011 | A12 = −2.55794e−012 |
| R21 | K = −8.54682e+001 | A4 = −3.90697e−005 |
| | A6 = 1.32877e−006 | A8 = −2.37517e−007 |
| | A10 = −2.37318e−009 | A12 = 5.18905e−010 |
| R22 | K = −9.95498e−001 | A4 = 4.03442e−004 |
| | A6 = −6.53274e−006 | A8 = −1.90482e−007 |
| | A10 = 7.91243e−009 | A12 = 3.70686e−010 |

Various Data
Zoom Ratio 10.01

| | Wide-Angle End | Middle Focal Length | Telephoto End |
|---|---|---|---|
| Focal Length | 3.12 | 4.73 | 31.26 |
| F-number | 1.85 | 2.14 | 3.00 |
| Half Angle of View | 39.24 | 32.38 | 5.48 |
| Image Height | 2.55 | 3.00 | 3.00 |
| Lens Total Length | 91.56 | 91.56 | 91.56 |
| BF | 5.64 | 5.63 | 5.96 |
| d5 | 0.76 | 5.33 | 29.25 |
| d13 | 32.20 | 16.67 | 1.71 |
| d14 | 9.79 | 16.10 | 1.21 |
| d20 | 1.89 | 2.32 | 13.00 |
| d22 | 3.13 | 7.35 | 2.28 |
| d27 | 2.50 | 2.49 | 2.82 |

-continued

Unit: mm

Data of Each Lens Unit

| Lens Unit | First Surface | Focal Length |
|---|---|---|
| 1 | 1 | 59.22 |
| 2 | 6 | −7.62 |
| 3 | 14 | ∞ |
| 4 | 15 | 13.77 |
| 5 | 21 | −12.35 |
| 6 | 23 | 12.72 |
| 7 | 28 | ∞ |

TABLE 1

| | Numerical Example | | | | |
|---|---|---|---|---|---|
| | 1 | 2 | 3 | 4 | 5 |
| fw | 3.129 | 3.521 | 3.610 | 3.807 | 3.122 |
| ft | 31.291 | 52.809 | 36.100 | 38.280 | 31.265 |
| ωw | 43.773 | 40.429 | 39.726 | 38.277 | 43.833 |
| ωt | 5.414 | 3.206 | 4.692 | 4.446 | 5.420 |
| f1 | 58.937 | 51.558 | 51.979 | 50.256 | 59.222 |
| f2 | −7.581 | −8.183 | −7.849 | −8.216 | −7.622 |
| f3 | 13.832 | 15.590 | 14.009 | 14.118 | 13.774 |
| f4 | −12.282 | −15.581 | −12.253 | −12.792 | −12.353 |
| f5 | 12.579 | 13.395 | 12.816 | 13.470 | 12.717 |
| β2W | −0.166 | −0.205 | −0.197 | −0.215 | −0.165 |
| β2T | −0.425 | −1.238 | −0.639 | −0.798 | −0.431 |
| β3W | −0.279 | −0.311 | −0.298 | −0.296 | −0.278 |
| β3T | −1.100 | −0.810 | −0.944 | −0.803 | −1.096 |
| DS3 | 16.123 | 17.675 | 15.640 | 16.138 | 16.103 |
| Condition | | | | | |
| (1) DS3/f3 | 1.166 | 1.134 | 1.116 | 1.143 | 1.169 |
| (2) f3/f2 | −1.825 | −1.905 | −1.785 | −1.718 | −1.807 |
| (3) f2/√(fw × ft) | −0.766 | −0.600 | −0.688 | −0.681 | −0.771 |
| (4) (β2T/β2W)/(β3T/β3W) | 0.652 | 2.321 | 1.025 | 1.363 | 0.662 |
| (5) β3T/β3W | 3.939 | 2.605 | 3.171 | 2.717 | 3.946 |
| (6) vd4 | 71.68 | 71.68 | 71.68 | 81.56 | 71.68 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-245077 filed Nov. 1, 2010 and No. 2011-214967 filed Sep. 29, 2011, which are hereby incorporated by reference herein in their entirety.

What is claimed is:

1. A zoom lens comprising, in order from an object side to an image side:
a first lens unit having a positive refractive power;
a second lens unit having a negative refractive power;
an aperture stop;
a third lens unit having a positive refractive power;
a fourth lens unit having a negative refractive power; and
a fifth lens unit having a positive refractive power,
wherein during zooming from a wide-angle end to a telephoto end, the first lens unit is configured to remain stationary, the second lens unit, the third lens unit, and the fourth lens unit are configured to move separately from one another, and the aperture stop is configured to move along a locus convex towards the object side,
wherein, when f3 is a focal length of the third lens unit and DS3 is an interval between the aperture stop and the third lens unit at a zooming position at which the aperture stop is located closest to the object side, the following condition is satisfied:

$$0.5 < DS3/f3 < 2.0.$$

2. The zoom lens according to claim 1, wherein the fourth lens unit is configured to move along a locus convex towards the object side to be located at a position closest to the object side at a zooming position at which the aperture stop is located closest to the object side.

3. The zoom lens according to claim 1, wherein, when f2 is a focal length of the second lens unit and f3 is a focal length of the third lens unit, the following condition is satisfied:

$$-2.50 < f3/f2 < -1.50.$$

4. The zoom lens according to claim 1, wherein, when f2 is a focal length of the second lens unit, fw is a focal length of the zoom lens at the wide-angle end, and ft is a focal length of the zoom lens at the telephoto end, the following condition is satisfied:

$$-1.00 < f2/(fw \times ft)^{1/2} < -0.50.$$

5. The zoom lens according to claim 1, wherein, when β2W is a lateral magnification of the second lens unit at the wide-angle end, β2T is a lateral magnification of the second lens unit at the telephoto end, β3W is a lateral magnification of the third lens unit at the wide-angle end, and β3T is a lateral magnification of the third lens unit at the telephoto end, the following condition is satisfied:

$$0.3 < (\beta 2T/\beta 2W)/(\beta 3T/\beta 3W) < 3.0.$$

6. The zoom lens according to claim 1, wherein, when β3W is a lateral magnification of the third lens unit at the wide-angle end and β3T is a lateral magnification of the third lens unit at the telephoto end, the following condition is satisfied:

$$1.5 < \beta 3T/\beta 3W < 4.5.$$

7. The zoom lens according to claim 1, wherein, when vd4 is a dispersion value of a material of one negative lens included in the fourth lens unit, the following condition is satisfied:

$$50 < vd4 < 90.$$

8. The zoom lens according to claim 1, wherein the fifth lens unit includes three lenses.

9. A zoom lens comprising, in order from an object side to an image side:
a first lens unit having a positive refractive power;
a second lens unit having a negative refractive power;
an aperture stop;
a third lens unit having a positive refractive power;
a fourth lens unit having a negative refractive power; and
a fifth lens unit having a positive refractive power,
wherein during zooming from a wide-angle end to a telephoto end, the first lens unit is configured to remain stationary, the second lens unit, the third lens unit, and the fourth lens unit are configured to move separately from one another, and the aperture stop is configured to move along a locus convex towards the object side,
wherein, when f2 is a focal length of the second lens unit, fw is a focal length of the zoom lens at the wide-angle end, and ft is a focal length of the zoom lens at the telephoto end, the following condition is satisfied:

$-1.00 < f2/(fw \times ft)^{1/2} < -0.50.$

10. The zoom lens according to claim 9, wherein the fourth lens unit is configured to move along a locus convex towards the object side to be located at a position closest to the object side at a zooming position at which the aperture stop is located closest to the object side.

11. The zoom lens according to claim 9, wherein, when f2 is a focal length of the second lens unit and f3 is a focal length of the third lens unit, the following condition is satisfied:

$-2.50 < f3/f2 < -1.50.$

12. The zoom lens according to claim 9, wherein, when β2W is a lateral magnification of the second lens unit at the wide-angle end, β2T is a lateral magnification of the second lens unit at the telephoto end, β3W is a lateral magnification of the third lens unit at the wide-angle end, and β3T is a lateral magnification of the third lens unit at the telephoto end, the following condition is satisfied:

$0.3 < (\beta 2T/(\beta 2W)/(\beta 3T/(\beta 3W) < 3.0.$

13. The zoom lens according to claim 9, wherein, when β3W is a lateral magnification of the third lens unit at the wide-angle end and β3T is a lateral magnification of the third lens unit at the telephoto end, the following condition is satisfied:

$1.5 < \beta 3T/\beta 3W < 4.5.$

14. The zoom lens according to claim 9, wherein, when vd4 is a dispersion value of a material of one negative lens included in the fourth lens unit, the following condition is satisfied:

$50 < vd4 < 90.$

15. The zoom lens according to claim 9, wherein the fifth lens unit includes three lenses.

16. An image pickup apparatus comprising:
a zoom lens; and
an image sensor configured to receive an image formed by the zoom lens,
wherein the zoom lens comprises, in order from an object side to an image side:
a first lens unit having a positive refractive power;
a second lens unit having a negative refractive power;
an aperture stop;
a third lens unit having a positive refractive power;
a fourth lens unit having a negative refractive power; and
a fifth lens unit having a positive refractive power, and
wherein during zooming from a wide-angle end to a telephoto end, the first lens unit is configured to remain stationary, the second lens unit, the third lens unit, and the fourth lens unit are configured to move separately from one another, and the aperture stop is configured to move along a locus convex towards the object side,
wherein, when f3 is a focal length of the third lens unit and DS3 is an interval between the aperture stop and the third lens unit at a zooming position at which the aperture stop is located closest to the object side, the following condition is satisfied:

$0.5 < DS3/f3 < 2.0.$

17. An image pickup apparatus comprising:
a zoom lens; and
an image sensor configured to receive an image formed by the zoom lens,
wherein the zoom lens comprises, in order from an object side to an image side:
a first lens unit having a positive refractive power;
a second lens unit having a negative refractive power;
an aperture stop;
a third lens unit having a positive refractive power;
a fourth lens unit having a negative refractive power; and
a fifth lens unit having a positive refractive power,
wherein during zooming from a wide-angle end to a telephoto end, the first lens unit is configured to remain stationary, the second lens unit, the third lens unit, and the fourth lens unit are configured to move separately from one another, and the aperture stop is configured to move along a locus convex towards the object side,
wherein, when f2 is a focal length of the second lens unit, fw is a focal length of the zoom lens at the wide-angle end, and ft is a focal length of the zoom lens at the telephoto end, the following condition is satisfied:

$-1.00 < f2/(fw \times ft)^{1/2} < -0.50.$

* * * * *